(12) United States Patent
    Tamura et al.

(10) Patent No.: US 10,699,248 B2
(45) Date of Patent: Jun. 30, 2020

(54) INSPECTION MANAGEMENT SYSTEM AND INSPECTION MANAGEMENT METHOD

(71) Applicant: Panasonic Intellectual Property Management Co., Ltd., Osaka (JP)

(72) Inventors: Kento Tamura, Osaka (JP); Atsushi Yoshida, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 75 days.

(21) Appl. No.: 15/816,031

(22) Filed: Nov. 17, 2017

(65) Prior Publication Data
    US 2018/0189741 A1    Jul. 5, 2018

(30) Foreign Application Priority Data
    Jan. 5, 2017    (JP) ................................ 2017-000700

(51) Int. Cl.
    *G06Q 10/10*    (2012.01)
    *G05B 19/048*   (2006.01)
    (Continued)

(52) U.S. Cl.
    CPC .......... *G06Q 10/1093* (2013.01); *F24F 11/30* (2018.01); *F24F 11/38* (2018.01);
    (Continued)

(58) Field of Classification Search
    CPC ................................................. G06Q 10/1093
    (Continued)

(56) References Cited

U.S. PATENT DOCUMENTS 5,027,268 A * 6/1991 Sakurai .................. G06Q 10/06
                                                    700/79
5,729,474 A * 3/1998 Hildebrand ........ G05D 23/1917
                                                    700/276
(Continued)

FOREIGN PATENT DOCUMENTS

JP    2004-060943    2/2004
JP    4052051 B2    2/2008
(Continued)

OTHER PUBLICATIONS

The Extended European Search Report dated May 9, 2018 for the related European Patent Application No. 17211135.3.

*Primary Examiner* — Folashade Anderson
(74) *Attorney, Agent, or Firm* — Greenblum & Bernstein, P.L.C.

(57) ABSTRACT

A system includes: a storage that stores a degree of deterioration determined from information that, for each part of each of air-conditioning facilities and/or refrigeration facilities during past inspections, an inspection worker perceived from the part; a first determiner that corrects and determines, on the basis of a history of degrees of deterioration of each part of the air-conditioning facilities and/or the refrigeration facilities during the past inspections, at least either scheduled dates of inspection of the air-conditioning facilities and/or the refrigeration facilities, or a priority of inspection work that is performed on each part of an air-conditioning facility and/or a cooling facility to be inspected; and a controller that causes an indicator to display at least either information indicating the scheduled dates of inspection or information indicating the priority of inspection work as determined by the first determiner.

4 Claims, 42 Drawing Sheets

(51) Int. Cl.
  *F24F 11/30* (2018.01)
  *F24F 11/64* (2018.01)
  *F24F 11/52* (2018.01)
  *F24F 11/38* (2018.01)
(52) U.S. Cl.
  CPC .............. *F24F 11/52* (2018.01); *F24F 11/64* (2018.01); *G05B 19/048* (2013.01); *G05B 2219/2614* (2013.01)
(58) Field of Classification Search
  USPC ........................................................ 705/7.18
  See application file for complete search history.

(56) References Cited

U.S. PATENT DOCUMENTS

| | | | | |
|---|---|---|---|---|
| 6,006,171 | A * | 12/1999 | Vines | G05B 15/02 702/184 |
| 7,124,059 | B2 * | 10/2006 | Wetzer | G05B 23/0283 702/184 |
| 9,679,253 | B2 * | 6/2017 | Gnocato | G06N 7/005 |
| 2008/0103870 | A1 * | 5/2008 | Aleksiejczyk | G06Q 10/06 705/7.18 |
| 2012/0101778 | A1 * | 4/2012 | Gyota | G05G 5/06 702/183 |
| 2012/0221371 | A1 * | 8/2012 | Hegazy | G06Q 10/087 705/7.25 |
| 2013/0018691 | A1 * | 1/2013 | Yumbe | G06Q 10/06313 705/7.21 |
| 2013/0138472 | A1 | 5/2013 | Hasegawa | |
| 2018/0068275 | A1 * | 3/2018 | Okuda | G06Q 10/10 |
| 2018/0330291 | A1 * | 11/2018 | Brough | G06F 3/0485 |

FOREIGN PATENT DOCUMENTS

| | | |
|---|---|---|
| JP | 2013-213669 | 10/2013 |
| JP | 5621888 B2 | 11/2014 |

* cited by examiner

FIG. 7

| DATE AND TIME OF DETECTION | HOT AND CHILLED WATER INLET TEMPERATURE | HOT AND CHILLED WATER OUTLET TEMPERATURE | CONDENSATION TEMPERATURE | COOLING WATER INTERMEDIATE TEMPERATURE | COOLING WATER OUTLET TEMPERATURE | PERCENTAGE OF COOLING WATER FLOW RATE | ... |
|---|---|---|---|---|---|---|---|
| 12:00 6/5/2015 | 11.7 | 7.8 | 34.4 | 32.2 | 33.2 | 99.8 | |
| 13:00 6/5/2015 | 11.7 | 7.8 | 34.4 | 32.2 | 33.2 | 99.8 | |
| 14:00 6/5/2015 | 12.7 | 8.0 | 34.1 | 31.5 | 33.0 | 100.0 | |
| 15:00 6/5/2015 | 13.0 | 8.2 | 34.6 | 32.5 | 34.0 | 99.6 | |
| 16:00 6/5/2015 | 11.8 | 8.2 | 34.3 | 32.3 | 33.6 | 100.0 | |
| ... | | | | | | | |

| DATE AND TIME OF INSPECTION | DEGREE OF DETERIORATION OF COOLING WATER |
|---|---|
| 12:00 6/5/2015 | 1.65 |
| 13:00 6/5/2015 | 1.65 |
| 14:00 6/5/2015 | 1.74 |
| 15:00 6/5/2015 | 1.20 |
| 16:00 6/5/2015 | 1.24 |
| ⋮ | |

FIG. 10

| DATE AND TIME OF WORK | NAME OF PROPERTY | NAME OF MACHINE | ALARM | REASON FOR VISIT | WORK CONTENTS |
|---|---|---|---|---|---|
| 05/01/2015 | PROPERTY A | ABS SYSTEM 1 | | PERIODIC INSPECTION | VISITED SITE FOR PERIODIC INSPECTION AND CONFIRMED COOLING WATER CONTAMINATION. INPUTTED WATER-TREATMENT AGENT FOR PREVENTION OF COOLING WATER CONTAMINATION. |
| 05/12/2015 | PROPERTY B | ABS SYSTEM 2 | ALARM A | ALARM RESPONSE | CONFIRMED CONTAMINATION OF COOLING WATER ON SITE IN RESPONSE TO ALARM CALL ABOUT COOLING WATER CONTAMINATION AND FOUND ADHERENCE OF LARGE AMOUNT OF GROSS CONTAMINATION. PERFORMED BRUSH CLEANING. |
| 05/19/2015 | PROPERTY C | ABS SYSTEM 1 | ALARM B | ALARM RESPONSE | ON DAY FOLLOWING CONTACT FOR DISPLAY, VISITED FOR DISPLAY CONFIRMATION BUT FOUND NO DISPLAY. WITH WORKING OPERATION CONFIRMED GOOD, WAIT AND SEE HOW IT WORKS. |

FIG. 11A

| DATE AND TIME OF WORK | NAME OF PROPERTY | NAME OF MACHINE | ALARM | REASON FOR VISIT | WORK CONTENTS | EXTRACTED WORDS |
|---|---|---|---|---|---|---|
| 05/01/2015 | PROPERTY A | ABS SYSTEM 1 | | PERIODIC INSPECTION | VISITED SITE FOR PERIODIC INSPECTION AND CONFIRMED COOLING WATER CONTAMINATION. INPUTTED WATER-TREATMENT AGENT FOR PREVENTION OF COOLING WATER CONTAMINATION. | PERIODIC, INSPECTION, VISIT, COOLING, WATER, CONTAMINATION, WATER-TREATMENT AGENT, INPUT |
| 05/12/2015 | PROPERTY B | ABS SYSTEM 2 | ALARM A | ALARM RESPONSE | CONFIRMED CONTAMINATION OF COOLING WATER ON SITE IN RESPONSE TO ALARM CALL ABOUT COOLING WATER CONTAMINATION AND FOUND ADHERENCE OF LARGE AMOUNT OF GROSS CONTAMINATION. PERFORMED BRUSH CLEANING. | ALARM A, COOLING WATER, CONTAMINATION, ALARM, CALL, GROSS, CONTAMINATION, LARGE AMOUNT, ADHERENCE, BRUSH CLEANING |
| 05/19/2015 | PROPERTY C | ABS SYSTEM 1 | ALARM A | ALARM RESPONSE | ON DAY FOLLOWING CONTACT FOR DISPLAY, VISITED FOR DISPLAY CONFIRMATION BUT FOUND NO DISPLAY. WITH WORKING OPERATION CONFIRMED GOOD, WAIT AND SEE HOW IT WORKS. | ALARM A, VISIT, NO DISPLAY, OPERATION, CONFIRM, GOOD, WAIT, SEE HOW IT WORKS |

FIG. 11B

| | EXTRACTED WORDS OF WORK CONTENTS |
|---|---|
| RECORD OF WORK 1 | PERIODIC, INSPECTION, VISIT, COOLING, WATER, CONTAMINATION, WATER-TREATMENT AGENT, INPUT |
| RECORD OF WORK 2 | ALARM A, COOLING WATER, CONTAMINATION, ALARM, CALL, GROSS, CONTAMINATION, LARGE AMOUNT, ADHERENCE, BRUSH CLEANING |
| RECORD OF WORK 3 | ALARM A, VISIT, NO DISPLAY, OPERATION, CONFIRM, GOOD, WAIT, SEE HOW IT WORKS |

FIG. 11C

| FEATURE EXTRACTION | |
|---|---|
| PRESENCE OR ABSENCE OF ALARM | KEYWORDS |
| ALARM GENERATED | ALARM GENERATION, ALARM RESPONSE, ... |
| ALARM NOT YET GENERATED | PERIODIC INSPECTION, CONTRACT INSPECTION, ... |

| PRESENCE OR ABSENCE OF WORK | KEYWORDS |
|---|---|
| WORK GENERATED | CONFIRMED CONTAMINATION, ADHERENCE, CLEANING, INPUT, ... |
| WORK NOT YET GENERATED | NO DISPLAY, SEE HOW IT WORKS, FOUND NO CONTAMINATION, ... |

| EXTENT OF DETERIORATION | KEYWORDS |
|---|---|
| HIGH DEGREE OF DETERIORATION | GROSS, VERY, LARGE AMOUNT, SAME-DAY RESPONSE, .... |
| MEDIUM DEGREE OF DETERIORATION | MEDIUM AMOUNT OF, BRUSH CLEANING, WATER-TREATMENT AGENT, ... |
| LOW DEGREE OF DETERIORATION | SEE HOW IT WORKS, GOOD, NO PROBLEM, ... |

FIG. 11D

|  | WORK FEATURES | | |
|---|---|---|---|
|  | PRESENCE OR ABSENCE OF ALARM | PRESENCE OR ABSENCE OF WORK | RATE OF DETERIORATION OF PARTS |
| RECORD OF WORK 1 | NO | YES | MEDIUM |
| RECORD OF WORK 2 | YES | YES | HIGH |
| RECORD OF WORK 3 | YES | NO | LOW |

FIG. 12A

| AMOUNT-OF-CORRECTION DETERMINATION TABLE | | | |
|---|---|---|---|
| PRESENCE OR ABSENCE OF ALARM | PRESENCE OR ABSENCE OF WORK | RATE OF DETERIORATION OF PARTS | AMOUNT OF CORRECTION |
| NO | NO | LOW | 1.0 |
| NO | YES | MEDIUM | 0.9 |
| NO | YES | HIGH | 0.8 |
| YES | NO | LOW | 1.2 |
| YES | YES | MEDIUM | 1.0 |
| YES | YES | HIGH | 0.8 |
| ⋮ | | | |

FIG. 12B

| | AMOUNT OF CORRECTION |
|---|---|
| RECORD OF WORK 1 | 0.9 |
| RECORD OF WORK 2 | 0.8 |
| RECORD OF WORK 3 | 1.2 |

| AMOUNT OF CORRECTION $W_K$ |
|---|
| RECORD OF WORK 1: 0.9 |
| RECORD OF WORK 2: 0.8 |
| RECORD OF WORK 3: 1.2 |
| RECORD OF WORK k: $W_K$ |
| ⋮ |
| RECORD OF WORK N: $W_N$ |

FIG. 30

| DATE AND TIME OF WORK | NAME OF PROPERTY | NAME OF MACHINE | ALARM | REASON FOR VISIT | WORK CONTENTS |
|---|---|---|---|---|---|
| 05/01/2012 | PROPERTY B | ABS SYSTEM 1 | | PERIODIC INSPECTION | VISITED SITE FOR PERIODIC INSPECTION AND CONFIRMED COOLING WATER CONTAMINATION. INPUTTED WATER-TREATMENT AGENT FOR PREVENTION OF COOLING WATER CONTAMINATION. |
| 05/12/2013 | PROPERTY B | ABS SYSTEM 1 | ALARM A | ALARM RESPONSE | CONFIRMED CONTAMINATION OF COOLING WATER ON SITE IN RESPONSE TO ALARM CALL ABOUT COOLING WATER CONTAMINATION AND FOUND ADHERENCE OF LARGE AMOUNT OF GROSS CONTAMINATION. PERFORMED BRUSH CLEANING. |
| 10/19/2013 | PROPERTY B | ABS SYSTEM 1 | ALARM A | ALARM RESPONSE | ON DAY FOLLOWING CONTACT FOR DISPLAY, VISITED FOR DISPLAY CONFIRMATION BUT FOUND NO DISPLAY. WITH WORKING OPERATION CONFIRMED GOOD, WAIT AND SEE HOW IT WORKS. |
| ... | ... | ... | ... | ... | ... |

FIG. 31A

| | WORK FEATURES | | |
|---|---|---|---|
| | PRESENCE OR ABSENCE OF ALARM | PRESENCE OR ABSENCE OF WORK | RATE OF DETERIORATION OF PARTS |
| RECORD OF WORK 1 | NO | YES | MEDIUM |
| RECORD OF WORK 2 | YES | YES | HIGH |
| RECORD OF WORK 3 | YES | NO | LOW |

FIG. 31B

| AMOUNT-OF-CORRECTION DETERMINATION TABLE | | | |
|---|---|---|---|
| PRESENCE OR ABSENCE OF ALARM | PRESENCE OR ABSENCE OF WORK | RATE OF DETERIORATION OF PARTS | AMOUNT OF CORRECTION |
| NO | NO | LOW | 1.0 |
| NO | YES | MEDIUM | 1.5 |
| NO | YES | HIGH | 2.0 |
| YES | NO | LOW | 0.0 |
| YES | YES | MEDIUM | 1.0 |
| YES | YES | HIGH | 1.5 |
| ⋮ | | | |

FIG. 31C

| | AMOUNT OF CORRECTION |
|---|---|
| RECORD OF WORK 1 | 1.5 |
| RECORD OF WORK 2 | 1.5 |
| RECORD OF WORK 3 | 0.0 |

FIG. 32

| AMOUNT OF CORRECTION $W_K$ |
| --- |
| RECORD OF WORK 1: 1.5 |
| RECORD OF WORK 2: 1.5 |
| RECORD OF WORK 3: 0 |
| RECORD OF WORK k: $W_K$ |
| ⋮ |
| RECORD OF WORK N: $W_N$ |

INSPECTION MANAGEMENT SYSTEM AND INSPECTION MANAGEMENT METHOD

BACKGROUND

1. Technical Field

The present disclosure relates to an inspection management system and an inspection management method.

2. Description of the Related Art

In the fields of machines such as air-conditioning facilities, there has been known a system in which data pertaining to the operational statuses of such machines, such as operating data, obtained by performing measurements with various types of sensor are accumulated in a server for management.

For example, Japanese Patent No. 5621888 discloses a system that allows an estimated time of failure due to aged deterioration to be displayed. According to Japanese Patent No. 5621888, inspections, maintenance, or repairs can be performed on failures preferentially in order of proximity of times of emergence, as times of failure can be predicted on the basis of predetermined common rules.

Further, Japanese Patent No. 4052051 discloses a system that can make a more accurate failure diagnose of an air-conditioning facility. Japanese Patent No. 4052051 discloses determining an order of priority of points to be checked for identifying a failure cause from the past historical information on the air-conditioning facility. The historical information is mainly a history of output values of sensors provided in the air-conditioning facility.

However, the system disclosed in Japanese Patent No. 5621888 is insufficient as a method for determining an order of priority of inspection work, as there are variations in the prediction of the times of failure, depending on where the machines are installed and how the machines are operated. Further, the system disclosed in Japanese Patent No. 4052051, too, is insufficient as a method for determining an order of priority of inspection work. Not limited to the air-conditioning facilities, there is a similar problem for refrigeration facilities.

SUMMARY

One non-limiting and exemplary embodiment provides a system and a method that make it possible to further improve the efficiency of inspection management of air-conditioning facilities and/or refrigeration facilities.

In one general aspect, the techniques disclosed here feature a system including: a storage that stores a degree of deterioration determined from information that, for each part of each of air-conditioning facilities and/or refrigeration facilities during past inspections, an inspection worker perceived from the part; a first determiner that corrects and determines, on the basis of a history of degrees of deterioration of each part of the air-conditioning facilities and/or the refrigeration facilities during the past inspections, at least either scheduled dates of inspection of the air-conditioning facilities and/or the refrigeration facilities, or a priority of inspection work that is performed on each part of an air-conditioning facility and a cooling facility to be inspected; and a controller that causes a display to display at least either information indicating the scheduled dates of inspection or information indicating the priority of inspection work as determined by the first determiner.

A system or the like according to an aspect of the present disclosure makes it possible to further improve the efficiency of inspection management of air-conditioning facilities and/or refrigeration facilities.

It should be noted that general or specific embodiments may be implemented as a system, a method, an integrated circuit, a computer program, a computer-readable storage medium such as a CD-ROM, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 7 is a conceptual diagram showing machine data that is stored in a machine data storage unit according to Embodiment 1;

FIG. 10 is a conceptual diagram showing records of work that are stored in a record-of-work storage unit according to Embodiment 1;

FIG. 11A is an explanatory diagram of work features that are extracted by a work feature extraction unit according to Embodiment 1;

FIG. 11B is an explanatory diagram of work features that are extracted by the work feature extraction unit according to Embodiment 1;

FIG. 11C is an explanatory diagram of work features that are extracted by the work feature extraction unit according to Embodiment 1;

FIG. 11D is an explanatory diagram of work features that are extracted by the work feature extraction unit according to Embodiment 1;

FIG. 12A is a diagram showing an example of an amount-of-correction determination table according to Embodiment 1;

FIG. 12B shows an example of an amount of correction that is determined by an amount-of-correction determination unit according to Embodiment 1;

FIG. 30 is a conceptual diagram showing records of work that are stored in a record-of-work storage unit according to Embodiment 2;

FIG. 31A is a diagram showing examples of work features that are extracted by a work feature extraction unit according to Embodiment 2;

FIG. 31B is a diagram showing an example of an amount-of-correction determination table according to Embodiment 2;

FIG. 31C is a diagram showing an example of an amount of correction that is determined by an amount-of-correction determination unit according to Embodiment 2;

FIG. 32 is a diagram showing an example of an amount of correction determined for each record of work;

Figure 1:
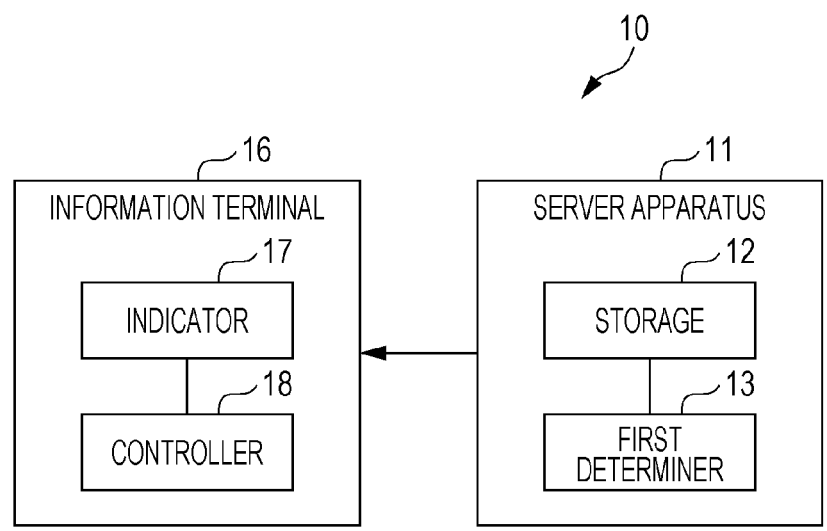
FIG. 1 is a block diagram showing an inspection management system according to an embodiment.

DETAILED DESCRIPTION (Underlying Knowledge Forming Basis of the Present Disclosure)

In the fields of machines such as air-conditioning facilities, there has been known a system in which data pertaining to the operational statuses of such machines, such as operating data, obtained by performing measurements with various types of sensor are accumulated in a server for management. Moreover, there has been a demand for efficiently performing inspection management on machines, i.e. management of maintenance operations of performing repairs, inspections, or maintenance on the machines, through the use of such a system.

However, as mentioned above, the system disclosed in Japanese Patent No. 5621888 is insufficient as a method for determining an order of priority of inspection work, as there are variations in the prediction of the times of failure, depending on where the machines are installed and how the machines are operated. Further, the system disclosed in Japanese Patent No. 4052051 is also insufficient as a method for determining an order of priority of inspection work, as the use as the historical information of values acquired from the sensors provided in the air-conditioning facility does not reflect information that an inspection worker perceived from parts. That is, even use of the conventional systems does not lead to a shortening of working hours of maintenance that workers and others perform or a reduction in the number of visits for maintenance, thus failing to improve the efficiency of inspection management. Not limited to the air-conditioning facilities such as air conditioners, there is a similar problem for refrigeration facilities such as showcases or refrigerators.

In one general aspect, the techniques disclosed here feature a system including: a storage that stores a degree of deterioration determined from information that, for each part of each of air-conditioning facilities and/or refrigeration facilities during past inspections, an inspection worker perceived from the part; a first determiner that corrects and determines, on the basis of a history of degrees of deterioration of each part of the air-conditioning facilities and/or the refrigeration facilities during the past inspections, at least either scheduled dates of inspection of the air-conditioning facilities and/or the refrigeration facilities, or a priority of inspection work that is performed on each part of an air-conditioning facility and/or a cooling facility to be inspected; and a controller that causes a display to display at least either information indicating the scheduled dates of inspection or information indicating the priority of inspection work as determined by the first determiner.

This makes it possible to further improve the efficiency of inspection management of the air-conditioning facilities and/or the refrigeration facilities. That is, the use of the history of degrees of deterioration makes it possible to determine the scheduled dates of inspection or the priorities of work items, thus making it possible to further improve the efficiency of inspection management of the air-conditioning facilities and/or the refrigeration facilities and achieve a shortening of working hours of maintenance that workers and others perform on the air-conditioning facilities and/or the refrigeration facilities and a reduction in the number of visits for maintenance of the air-conditioning facilities and/or the refrigeration facilities.

According to the above aspect, the system may further includes: an acquirer that acquires information pertaining to the degree of deterioration from a record of work performed on each part of each of the air-conditioning facilities and/or the refrigeration facilities; and a second determiner that determines the history of degrees of deterioration of each part of the air-conditioning facilities and/or the refrigeration facilities during the past inspections from the information pertaining to the degree of deterioration as acquired by the acquirer. The record of work may include the information that the worker perceived from the part. The acquirer may acquire the information pertaining to the degree of deterioration from the information that the worker perceived from the part. The storage may store the history of degrees of deterioration of each part of the air-conditioning facilities and/or the refrigeration facilities during the past inspections as determined by the second determiner.

With this, the use of the record of work performed on the air-conditioning facilities and/or the refrigeration facilities by workers and others makes it possible to determine the scheduled dates of inspection or the priorities of work items.

According to the above aspects, in consideration of the frequency of occurrence of past abnormalities in each part of the air-conditioning facilities and/or the refrigeration facilities, the first determiner may determine at least either the scheduled dates of inspection of the air-conditioning facilities, or the priority of inspection work that is performed on each part of the air-conditioning facility to be inspected.

With this, the use of the frequency of occurrence of past abnormalities in addition to the history of degrees of deterioration makes it possible to determine the scheduled dates of inspection or the priorities of work items.

In one general aspect, the techniques disclosed here feature a method including: (a) storing a degree of deterioration determined from information that, for each part of each of air-conditioning facilities during past inspections, an inspection worker perceived from the part; (b) correcting and determining, on the basis of a history of degrees of deterioration of each part of the air-conditioning facilities and/or the refrigeration facilities during the past inspections, at least either scheduled dates of inspection of the air-conditioning facilities, or a priority of inspection work that is performed on each part of an air-conditioning facility and/or the refrigeration facility to be inspected; and (c) causing a display to display at least either information indicating the scheduled dates of inspection or information indicating the priority of inspection work as determined in step (b).

This makes it possible to further improve the efficiency of inspection management of air-conditioning facilities. That is, this makes it possible to achieve a shortening of working hours of maintenance that workers and others perform on the air-conditioning facilities and/or the refrigeration facilities and a reduction in the number of visits for maintenance of the air-conditioning facilities and/or the refrigeration facilities.

It should be noted that general or specific embodiments may be implemented as a system, a method, an integrated circuit, a computer program, a computer-readable storage medium such as a CD-ROM, or any selective combination thereof.

Embodiments are described in detail below with reference to the drawings.

It should be noted that each of the embodiments described below shows a specific example of the present disclosure. In the embodiments described below, the numerical values, the shapes, the materials, the constituent elements, and the placement and connection of the constituent elements, the steps, and the orders of the steps are mere examples and not intended to limit the present disclosure. Those of the constituent elements in the embodiments described below which are not recited in an independent claim representing the most generic concept are described as optional constituent elements.

Further, in the embodiments described below, the term "normality" means a state where the desired function is available and the predetermined performance is maintained. The term "abnormality" means a state where the desired function is not available or the predetermined performance cannot be maintained, and is classified as "deterioration" or "failure". The term "deterioration" means a state where the desired function is available but there is a decrease in performance, and the term "failure" means a state where the desired function is no longer available. Further, the term "inspection" means a piece of work of checking a machine for abnormal places. Further, the term "maintenance" means a piece of work of bringing an abnormal place back to normal or almost normal. Further, the term "repair" means a piece of work that makes a failed function available again.

Embodiment

Configuration of Inspection Management System 10

Figure 2:
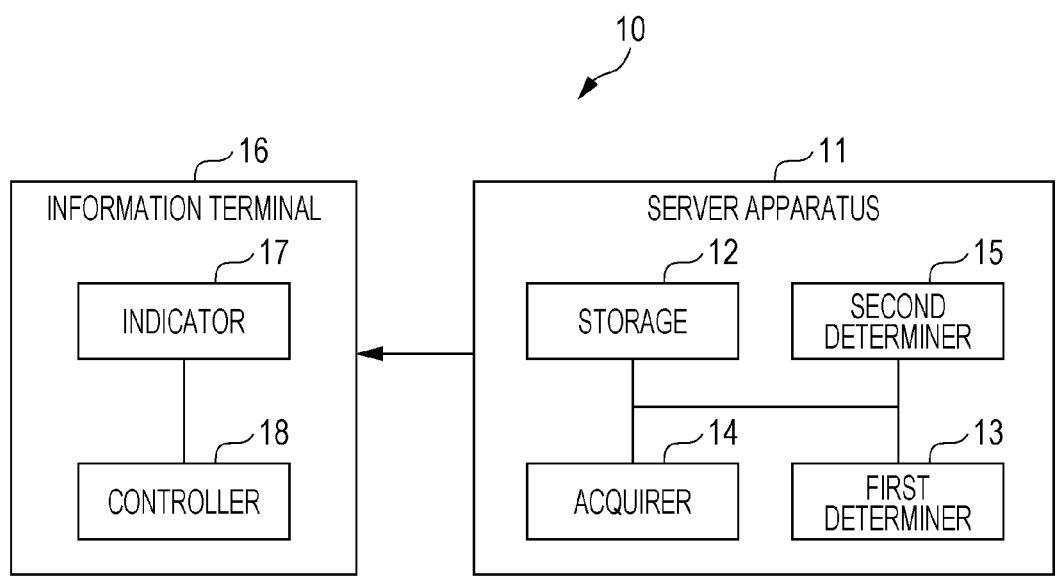
FIG. 2 is a block diagram showing in detail the inspection management system according to the embodiment.

FIG. 1 is a block diagram showing an inspection management system 10 according to the present embodiment. FIG. 2 is a block diagram showing in detail the inspection management system 10 according to the present embodiment. The inspection management system 10 shown in FIGS. 1 and 2 performs inspection management on air-conditioning facilities. This inspection management system 10 includes a server apparatus 11 and an information terminal 16 or the like.

Server Apparatus 11

The server apparatus 11 is an apparatus that distributes information to the information terminal 16 or the like and collects information from the information terminal 16 or the like via a network. Specifically, the server apparatus 11 is a computer. It should be noted that this network is a network via which the server apparatus 11 and the information terminal 16 or the like communicate with each other. This network may be a cable network or a wireless network. Further, this network may be the Internet.

As shown in FIG. 2, the server apparatus 11 includes a storage 12, a first determiner 13, an acquirer 14, and a second determiner 15. It should be noted that the constituent elements shown in FIG. 2 are optional constituent elements and one or some of these constituent elements may constitute the inspection management system 10. That is, as shown in FIG. 1, the server apparatus 11 does not need to include the acquirer 14 or the second determiner 15.

The storage 12 is a memory in which to store information and, for example, is a nonvolatile memory such as a hard disk. The storage 12 is an example of the storage of the present disclosure. The storage 12 stores a degree of deterioration determined from information that, for each part of each of the air-conditioning facilities during past inspections, an inspection worker perceived from the part. Further, the storage 12 stores a degree of deterioration of each part of each of the air-conditioning facilities during the past inspections as determined by the second determiner 15. Note here that the information that the worker perceived from the parts is information to which meanings are attached on the basis of sensory information obtained from the parts through the use of the five senses, somatic sensation, vestibular sensation, and the like of the worker. Examples include "hot", "heavy", "hard", "dirty", "clogged", and the like. The information that the worker perceived from the parts is not information obtained from sensors provided in the air-conditioning facilities.

The acquirer 14 is an example of the acquirer of the present disclosure. The acquirer 14 acquires information pertaining to the degree of deterioration from a record of work performed on the air-conditioning facilities. More specifically, the record of work includes the information that the worker perceived from the parts. The acquirer 14 acquires the information pertaining to the degree of deterioration from the information that the worker perceived from the parts.

The second determiner 15 is an example of the second determiner of the present disclosure. The second determiner 15 determines a history of degrees of deterioration of each part of the air-conditioning facilities during the past inspections from the information pertaining to the degree of deterioration as acquired by the acquirer 14.

The first determiner 13 is an example of the first determiner of the present disclosure. The first determiner 13 corrects and determines, on the basis of the history of degrees of deterioration of each part of the air-conditioning facilities during the past inspections, at least either scheduled dates of inspection of the air-conditioning facilities or a priority of inspection work that is performed on each part of an air-conditioning facility to be inspected. Further, in consideration of the frequency of occurrence of past abnormalities in each part of the air-conditioning facilities, the first determiner 13 may also determine at least either the scheduled dates of inspection of the air-conditioning facilities or the priority of inspection work that is performed on each part of the air-conditioning facility to be inspected. It should be noted that the first determiner 13 may also determine an amount of correction.

Information Terminal 16

The information terminal 16 is a terminal including a display. Specifically, the information terminal 16 is a computer including a display. The information terminal 16 may be a personal computer, a mobile terminal, a mobile phone, a smartphone, a tablet terminal, or the like. As shown in FIGS. 1 and 2, the information terminal 16 includes an indicator 17 and a controller 18.

The indicator 17 is a display and an example of the indicator of the present disclosure. The indicator 17 may be a liquid crystal display, a plasma display, or a cathode-ray tube. The indicator 17 displays at least either information indicating the scheduled dates of inspection or information indicating the priority of inspection work as determined by the server apparatus 11.

The controller 18 is an example of the controller of the present disclosure. The controller 18 causes the indicator 17 to display at least either the information indicating the scheduled dates of inspection or the information indicating the priority of inspection work as determined by the first determiner 13. The controller 18 needs only include a control function and includes an arithmetic processing unit (not illustrated) and a storage unit (not illustrated) storing a control program. An example of the arithmetic processing unit is an MPU or a CPU. An example of the storage unit is a memory. The controller 18 may be constituted by a single control unit that performs centralized control or may be constituted by control units that perform decentralized control in cooperation with each other.

It should be noted that the degree of deterioration thus determined may be stored in the storage 12 by the worker determining and inputting it or may be stored in the storage 12 after being determined from the record of work by the controller 18 embedded in the server or the like.

Operation of Inspection Management System 10

Figure 3:
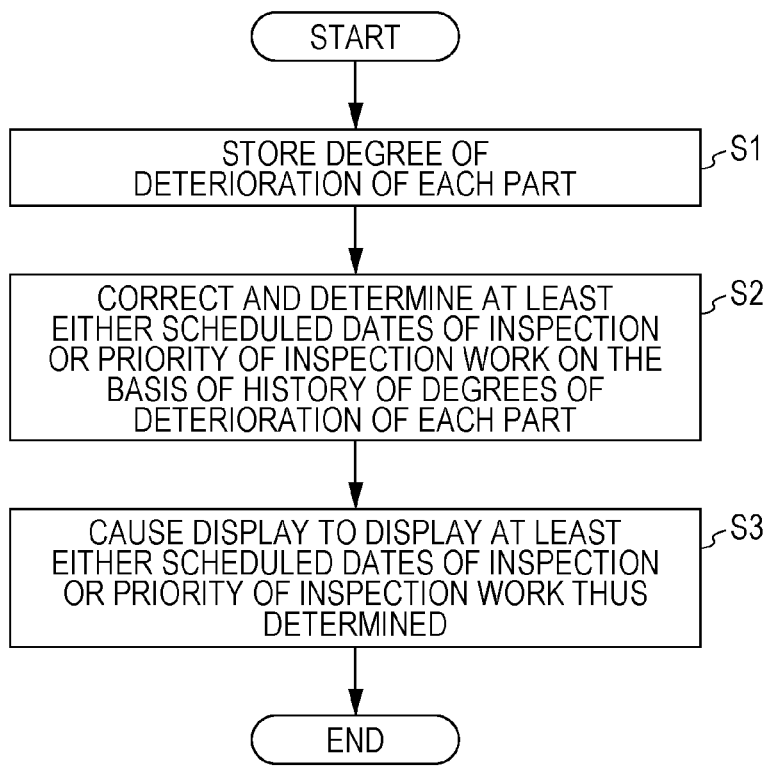
FIG. 3 is a flow chart showing an example of an operation of the inspection management system according to the embodiment.
Figure 4:
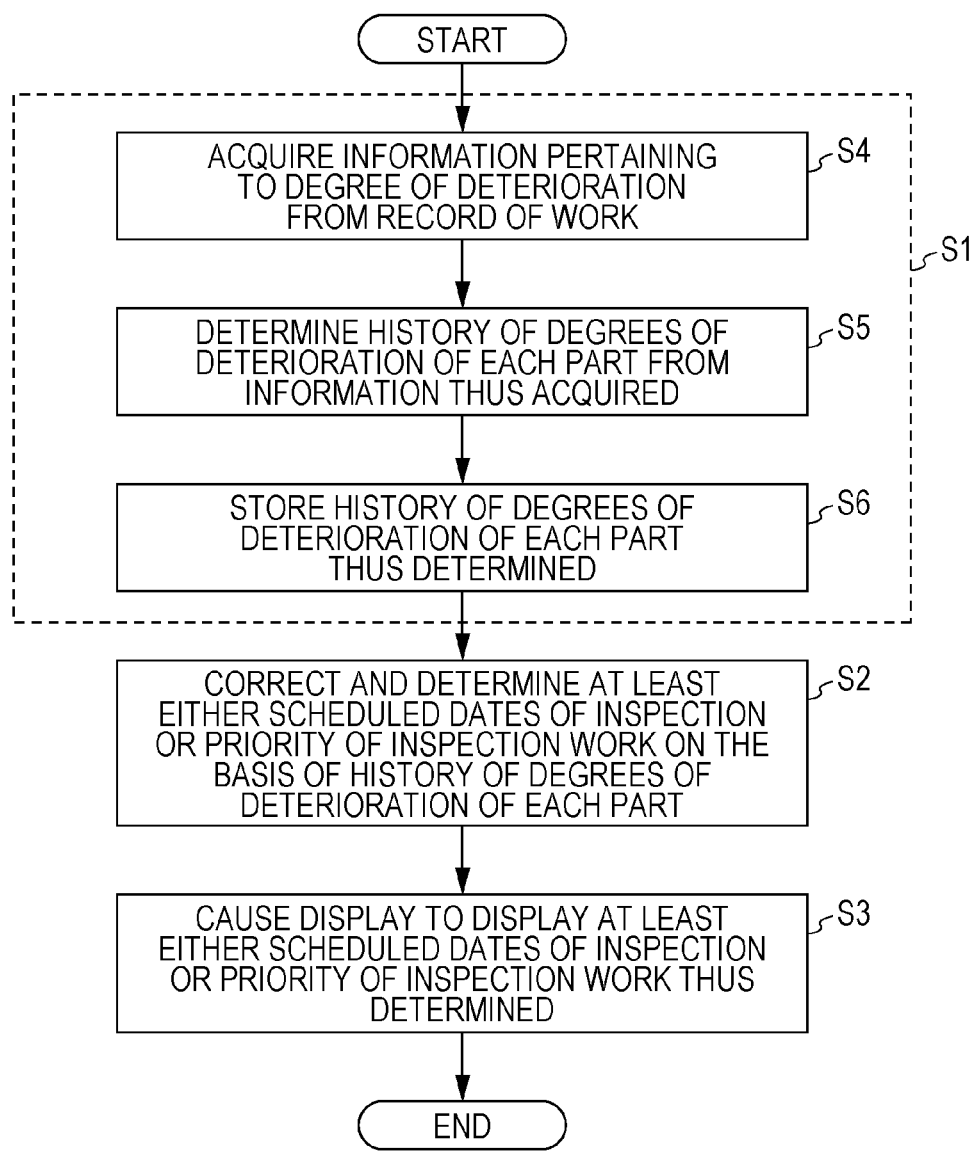
FIG. 4 is a flow chart showing an example of an operation of an information terminal according to the embodiment.

FIG. 3 is a flow chart showing an example of an operation of the inspection management system 10 shown in FIG. 1. FIG. 4 is a flow chart showing an example of an operation of the inspection management system 10 shown in FIG. 2. FIG. 4 shows a more detailed example of the operation shown in FIG. 3.

First, as shown in FIG. 3, the storage 12 stores a degree of deterioration determined from information that, for each part of each of the air-conditioning facilities during past inspections, an inspection worker perceived from the part (S1). More specifically, as shown in FIG. 4, in S1, first, the acquirer 14 acquires information pertaining to the degree of deterioration from a record of work performed on each part of each of the air-conditioning facilities (S4). Note here that the record of work includes the information that the worker perceived from the parts. Then, the acquirer 14 acquires the information pertaining to the degree of deterioration from the information that the worker perceived from the parts. Next, the second determiner 15 determines a history of degrees of deterioration of each part of the air-conditioning facilities during the past inspections from the information pertaining to the degree of deterioration as acquired in S4 (S5). Next, the storage 12 stores the history of degrees of deterioration of each part of each of the air-conditioning facilities during the past inspections as determined in S5 (S6).

Next, the first determiner 13 corrects and determines, on the basis of the history of degrees of deterioration of each part of the air-conditioning facilities during the past inspections, at least either scheduled dates of inspection of the air-conditioning facilities or a priority of inspection work that is performed on each part of an air-conditioning facility to be inspected (S2).

Next, the controller 18 causes the indicator 17 to display at least either information indicating the scheduled dates of inspection or information indicating the priority of inspection work as determined in S2 (S3).

It should be noted that the processes shown in FIGS. 3 and 4 are performed at appropriate timings. That is, these processes do not need to be successively performed.

Effects and the Like of Inspection Management System 10

Such a configuration and operation of the inspection management system 10 make it possible to improve the efficiency of inspection management of the air-conditioning facilities. That is, the use of the history of degrees of deterioration makes it possible to determine the scheduled dates of inspection or the priorities of work items, thus making it possible to further improve the efficiency of inspection management of the air-conditioning facilities and achieve a shortening of working hours of maintenance that workers and others perform on the air-conditioning facilities and a reduction in the number of visits for maintenance of the air-conditioning facilities. Further, the use of the record of work performed on the air-conditioning facilities by workers and others makes it possible to determine the scheduled dates of inspection or the priorities of work items. Furthermore, the use of the frequency of occurrence of past abnormalities in addition to the history of degrees of deterioration makes it possible to determine the scheduled dates of inspection or the priorities of work items.

The following describes specific examples of the inspection management system 10 as embodiments.

Embodiment 1

Embodiment 1 is described by taking, as an example, a case where scheduled dates of inspection of air-conditioning facilities are corrected and determined on the basis of a degree of deterioration of each part of each of the air-conditioning facilities during past inspections.

Configuration of Whole System 100

Figure 5:
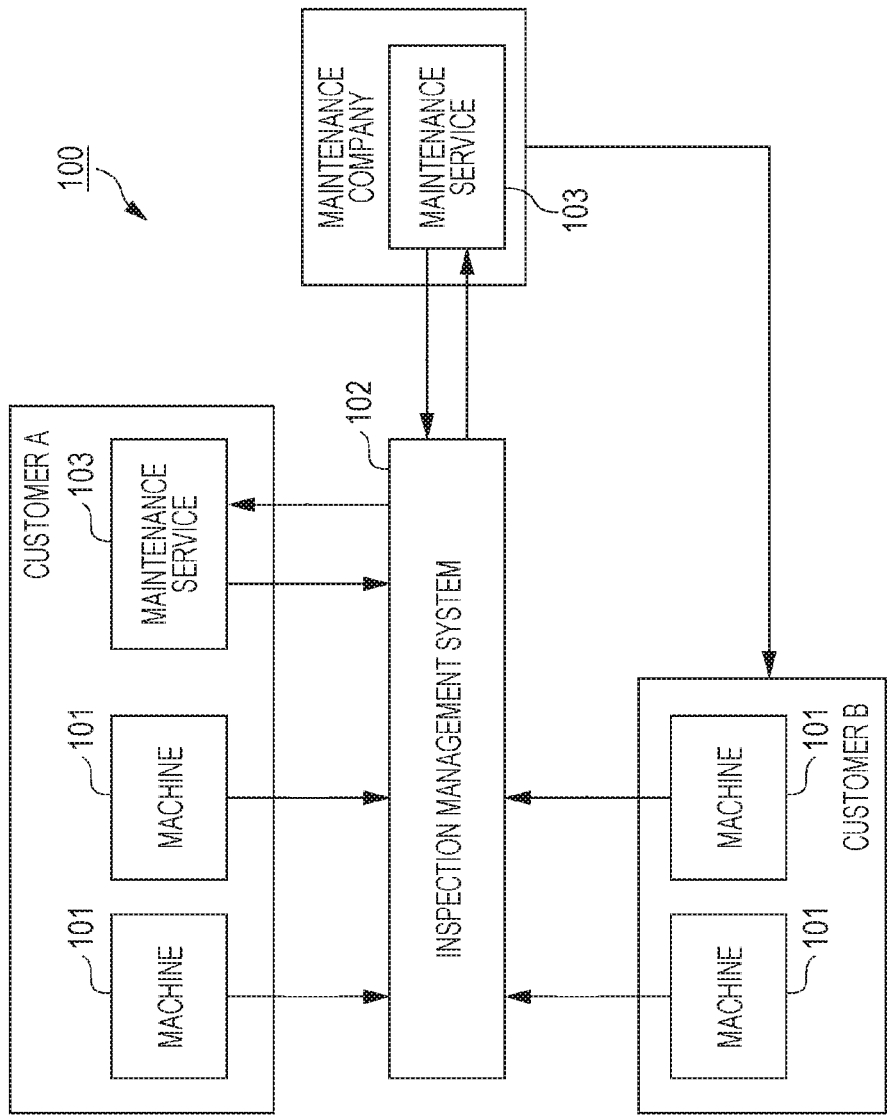
FIG. 5 is a diagram showing a configuration of a whole system according to Embodiment 1.

First, a configuration of a whole system 100 according to Embodiment 1 is described. FIG. 5 is a diagram showing the configuration of the whole system 100 according to Embodiment 1.

As shown in FIG. 5, the whole system 100 includes machines 101 such as air-conditioning facilities, an inspection management system 102, and maintenance services 103 that perform maintenance on the machines 101. It should be noted that the machines 101 are not limited to air-conditioning facilities but may be any machines such as refrigerating apparatuses such as absorption refrigerating machines, such as refrigeration facilities such as refrigerators or showcases, or lighting apparatuses. For example, the machines 101 may be facility machines in a building, manufacturing machines in a factory, or industrial machines that require maintenance.

The maintenance services 103 are services that perform work such as repairs, inspections, or maintenance that workers perform on the machines 101. Each of the maintenance services 103 is not only a service of a customer support department but, in some cases, a service of a designing department that develops machines or a sales department that deals with users.

For example, as shown in an example of a customer A, each customer is provided with a maintenance service 103, and each maintenance service 103 may perform maintenance on one or more machines 101 belonging to the corresponding customer. Further, as shown in an example of a customer B, a maintenance service 103 may be included in an outside expert maintenance service company. In this case, each customer does not need to have a department that performs a maintenance service 103. It should be noted that although, in the example shown here, the number of customers is 2 and two machines 101 belong to each of the customers, the numbers of customers and machines 101 may be arbitrary.

The inspection management system 102 is a specific example of the aforementioned inspection and management system 10 and an example of the inspection management system of the present disclosure. In Embodiment 1, the inspection management system 102 is connected to the machines 101 and the maintenance services 103 via a network.

Configuration of Inspection Management System 102

Figure 6:
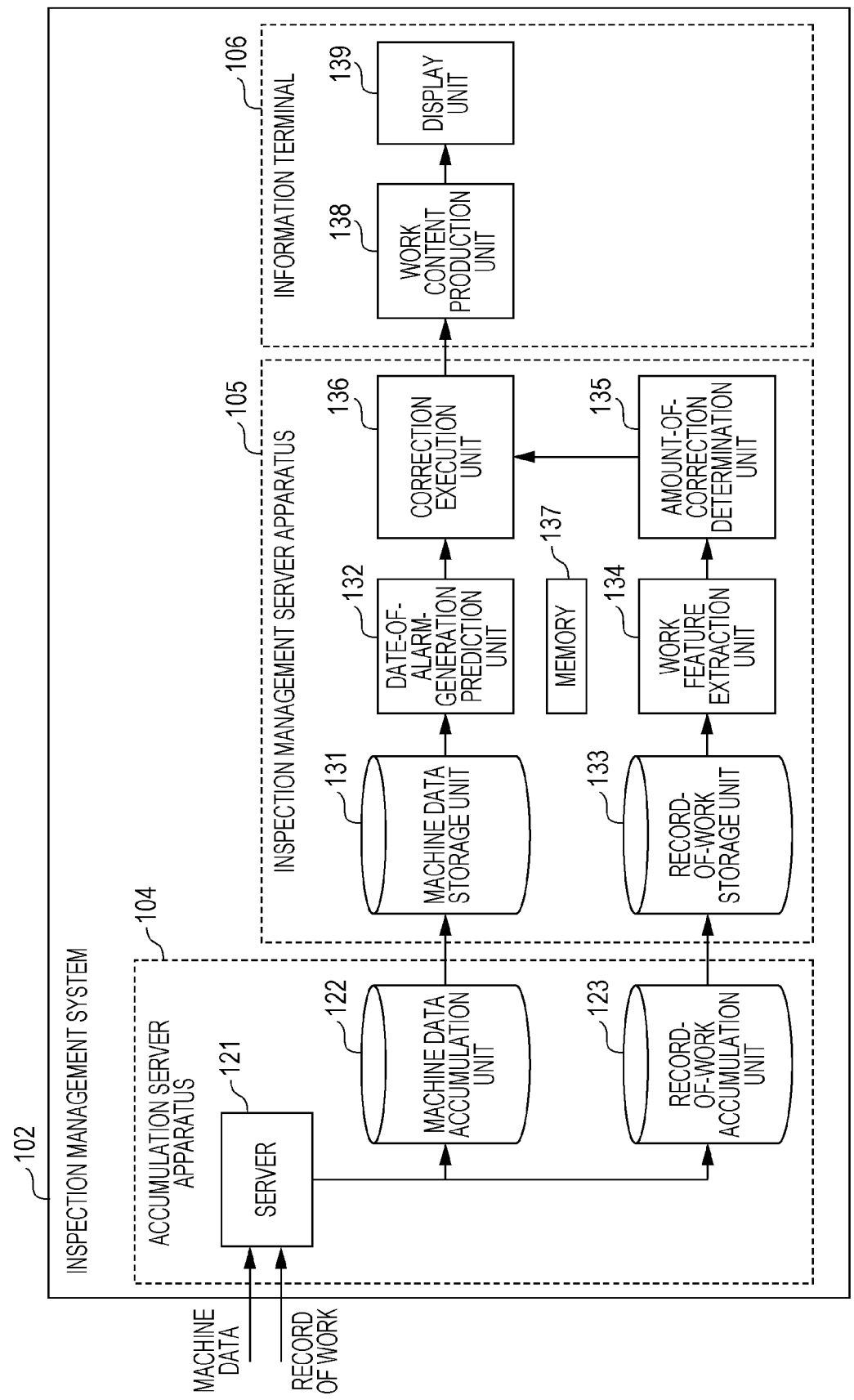
FIG. 6 is a block diagram of an inspection management system according to Embodiment 1.

A configuration of the inspection management system 102 is described in detail below. FIG. 6 is a block diagram of an inspection management system 102 according to Embodiment 1.

As shown in FIG. 6, the inspection management system 102 includes an accumulation server apparatus 104, an inspection management server apparatus 105, and an information terminal 106.

Configuration of Accumulation Server Apparatus 104

The accumulation server apparatus 104 includes a server 121, a machine data accumulation unit 122, and a record-of-work accumulation unit 123. The server 121 and the inspection management server apparatus 105 can communicate with each other either by cable or wirelessly.

The server 121 is not limited in its system architecture such as a cloud server form or an on-premises server. The server 121 sequentially acquires machine data from the machines 101 and accumulates the machine data in the machine data accumulation unit 122. Further, the server 121 sequentially acquires records of work from the maintenance services 103 and accumulates the records of work in the record-of-work accumulation unit 123.

Note here that the machine data indicate the states of the machines 101 and, for example, include measured values and the like of the characteristics of the machines 101 as detected by sensors installed in the machines 101. The records of work are records of work performed for maintenance of the machines 101 and, for example, are records of work and visual checks performed in maintenance of the machines 101 such as repairs, inspections, general maintenance, and cleaning that workers of the maintenance services 103 performed. The records of work each include a routine record and a non-routine record. The routine record is information whose items are set in advance. The non-routine record is non-routine information whose formats are not uniform, such as a free descriptive log of work.

Configuration of Inspection Management Server Apparatus 105

The inspection management server apparatus 105 is a computer including a display and may be a personal computer, a mobile terminal, or the like. It should be noted that the display is not illustrated, as the display is not an essential constituent element of the inspection management server apparatus 105. Further, the inspection management server apparatus 105 does not need to include a display and may distribute information to the display of the information terminal 106 and cause the display of the information terminal 106 to display the information.

As shown in FIG. 6, the inspection management server apparatus 105 includes a machine data storage unit 131, a date-of-alarm-generation prediction unit 132, a record-of-work storage unit 133, a work feature extraction unit 134, an amount-of-correction determination unit 135, a correction execution unit 136, and a memory 137. It should be noted that the machine data storage unit 131, the date-of-alarm-generation prediction unit 132, and the record-of-work storage unit 133 of the inspection management server apparatus 105 are optional constituent elements and one or some of these constituent elements may constitute the inspection management server apparatus 105.

Machine Data Storage Unit 131

The machine data storage unit 131 is a memory in which to store information and, for example, is a nonvolatile memory such as a hard disk. The machine data storage unit 131 stores some or all of the machine data accumulated in the machine data accumulation unit 122. In other words, the machine data storage unit 131 needs only store at least as much machine data as the date-of-alarm-generation prediction unit 132 can predict a date of alarm generation.

FIG. 7 is a conceptual diagram showing machine data that is stored in the machine data storage unit 131 according to Embodiment 1. FIG. 7 shows measured values and the like detected by the sensors installed in the machines 101 when the machines 101 are absorption refrigerating machines. In the example of machine data shown in FIG. 7, dates and times of detection are arranged in chronological order, and the hot and chilled water inlet temperature, the hot and chilled water outlet temperature, the condensation temperature, the cooling water intermediate temperature, the cooling water outlet temperature, the percentage of cooling water flow rate, and the like are stored for each date and time of detection.

Date-of-Alarm-Generation Prediction Unit 132

The date-of-alarm-generation prediction unit 132 predicts, with reference to the machine data stored in the machine data storage unit 131, a time of generation of an alarm that indicates that a failure in a machine 101 requires work such as inspection. This prediction may involve the use of a time series analytical method based on an AR (Autoregressive), MA (Moving Average), ARIMA (Autoregressive Integrated and Moving Average), or NN (Neural Network) model or the like. The term "alarm" here means a function of determining a failure in a case where the measured values satisfy certain conditions and notifying an administrator of the failure. In Embodiment 1, different conditions are set for each separate failed place.

Further, the date-of-alarm-generation prediction unit 132 may also predict a time of alarm generation with reference to an index obtained by processing the machine data stored in the machine data storage unit 131. This is described below with reference to a drawing.

Figures 8, 9:
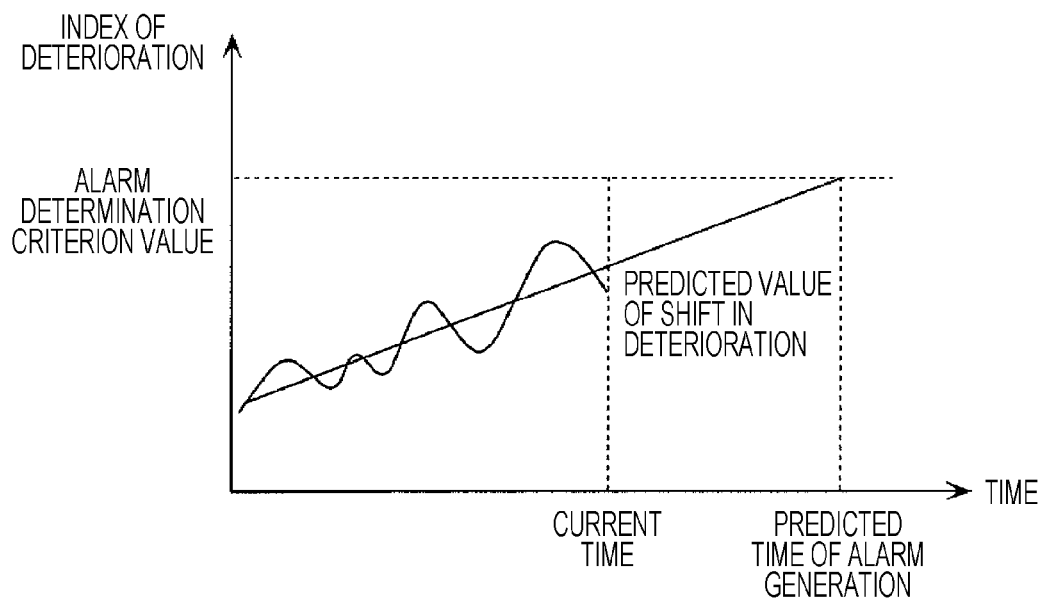
FIG. 8 is a diagram showing an example of an index obtained by processing the machine data shown in FIG. 7.
FIG. 9 is a conceptual diagram showing the prediction of a time of alarm generation using the index of deterioration shown in FIG. 8.

FIG. 8 is a diagram showing an example of an index obtained by processing the machine data shown in FIG. 7. FIG. 8 shows, as an example, an index of deterioration of a condenser, i.e. a part of an absorption refrigerating machine, and greater values indicate greater progression of deterioration.

An example of a method for calculating an index of deterioration of a condenser in order to predict a time of alarm generation about the condenser is described here. For example, the index of deterioration of the condenser is calculated according to Eq. (1):

$$\text{Index of Deterioration} = \Delta T/Q \tag{1}$$

where Q denotes the heat load.

Further, $\Delta T$ is the logarithmic mean temperature difference of the condenser and is expressed according to Eq. (2):

$$\Delta T = \frac{\Delta T_1 - \Delta T_2}{\ln\left(\frac{\Delta T_1}{\Delta T_2}\right)} \tag{2}$$

where $\Delta T_1$ is the temperature difference at the inlet of the condenser, $\Delta T_2$ is the temperature difference at the outlet of the condenser, V is the cooling water flow rate, $V_0$ is the value of standard of cooling water flow rate, and $\gamma$ is a coefficient, for example, 1.

It should be noted that the index of deterioration is not limited to the aforementioned example but may be calculated using an index obtained by processing machine data including data obtained by measuring measurement data such as the temperature, the flow rate, or the number of engine rotations.

FIG. 9 is a conceptual diagram showing the prediction of a time of alarm generation using the index of deterioration shown in FIG. 8. As shown in FIG. 9, the date-of-alarm-generation prediction unit 132 uses the time series analytical method to predict, as a predicted time of alarm generation or a predicted date of alarm generation, a time or a date when the index of deterioration reaches an alarm determination criterion value that is a value determined in advance either manually or from past data.

In this way, the date-of-alarm-generation prediction unit 132 may calculate the index of deterioration for each part or failed place of the machines 101 from the machine data stored in the machine data storage unit 131. Moreover, the date-of-alarm-generation prediction unit 132 may predict a predicted time of alarm generation or a predicted date of alarm generation with reference to the index of deterioration thus calculated.

It should be noted that the machine data storage unit 131 and the date-of-alarm-generation prediction unit 132 may be constituted by the accumulation server apparatus 104 and the accumulation server apparatus 104 may predict a predicted time of alarm generation or a predicted date of alarm generation and distribute it to the inspection management server apparatus 105.

Record-of-Work Storage Unit 133

The record-of-work storage unit 133 is a memory in which to store information and, for example, is a nonvolatile memory such as a hard disk. The record-of-work storage unit 133 stores some or all of the records of work accumulated in the record-of-work storage unit 123. In other words, the record-of-work storage unit 133 needs only store at least as many records of work as the work feature extraction unit 134 can extract work features and the amount-of-correction determination unit 135 can determine an amount of correction. Note here that these records of work are examples of records of work performed on the air-conditioning facilities of the present disclosure.

FIG. 10 is a conceptual diagram showing records of work that are stored in the record-of-work storage unit 133 according to Embodiment 1. The records of work shown in FIG. 10 are records of work performed for maintenance of the machines 101 and each include a routine record of information such as the date and time of work, the name of the property, the name of the machine, the alarm, the reason for visiting and a non-routine record of work contents in a free descriptive manner.

Work Feature Extraction Unit 134

The work feature extraction unit 134 is a specific example of the acquirer 14 and an example of the acquirer of the present disclosure. The work feature extraction unit 134 acquires information pertaining to the degree of deterioration from a record of work performed on each part of each of the air-conditioning facilities. Note here that, as mentioned above, the record of work includes the information that the worker perceived from the part. Further, the work feature extraction unit 134 is also a specific example of the second determiner 15 and an example of the second determiner of the present disclosure. The work feature extraction unit 134 determines the history of degrees of deterioration of each part of the air-conditioning facilities during the past inspections from the information pertaining to the degree of deterioration as acquired by the acquirer 14. In Embodiment 1, the work feature extraction unit 134 extracts work features including a degree of deterioration such as a rate of deterioration of parts from the records of work stored in the record-of-work storage unit 133. This example is described below with reference to drawings.

FIGS. 11A to 11D are each an explanatory diagram of work features that are extracted by the work feature extraction unit 134 according to Embodiment 1. FIGS. 11A and 11B show extracted words of the work contents in the records of work shown in FIG. 10, and FIG. 11C shows a dictionary of words that is used in the extraction of work features. FIG. 11D shows examples of extracted work features.

The work feature extraction unit 134 extracts keywords by conducting, for example, a morphological analysis of data at the time of occurrence of the same abnormality in the same machine out of data representing the records of work shown for example in FIG. 10. Specifically, as shown in FIGS. 11A and 11B, the work feature extraction unit 134 extracts, as keywords, words pertaining to the presence or absence of an alarm, the presence or absence of work such as inspection, and the extent of deterioration.

Further, the work feature extraction unit 134 determines the presence or absence of an alarm, the presence or absence of work such as inspection, the extent of deterioration, and the like for each record of work from the extracted keywords, i.e. such extracted words of work contents as those shown in FIG. 11B, with reference to such a dictionary of words as that shown in FIG. 11C. The dictionary of words that is used in the extraction of work features may be created manually or may be generated by machine learning. This allows the work feature extraction unit 134 to generate work features including the presence or absence of an alarm, the presence or absence of work such as inspection, the extent of deterioration, and the like for each record of work as shown for example in FIG. 11D.

It should be noted that although FIG. 11D shows work features including the presence or absence of an alarm, the presence or absence of work such as inspection, the extent of deterioration, and the like, this does not imply any limitation. The work features need only include at least a degree of deterioration such as an extent of deterioration for each record of work. The degree of deterioration for each record of work may be a degree of deterioration of each part of a machine 101 as recorded in that record of work.

Further, the work feature extraction unit 134 may transmit work features including an extracted degree of deterioration to the amount-of-correction determination unit 135 or may temporarily store the work features in the memory 137.

Amount-of-Correction Determination Unit 135

The amount-of-correction determination unit 135 is a specific example of the first determiner 13 and an example of the first determiner of the present disclosure. The amount-of-correction determination unit 135 determines an amount of correction. In Embodiment 1, the amount-of-correction determination unit 135 determines, from the work features extracted by the work feature extraction unit 134, an amount of correction to the time from the present to a predicted time of alarm generation or the number of days from the present to a predicted date of alarm generation. This example is described below with reference to drawings.

FIG. 12A is a diagram showing an example of an amount-of-correction determination table according to Embodiment 1. FIG. 12B shows an example of an amount of correction that is determined by the amount-of-correction determination unit 135 according to Embodiment 1.

The amount-of-correction determination unit 135 determines such an amount of correction as that shown in FIG. 12B from the work features shown for example in FIG. 11D with reference to the amount-of-correction determination table shown in FIG. 12A. It should be noted that FIG. 12A shows an amount of correction that is uniquely determined according to a combination of work features such as the presence or absence of an alarm, the presence or absence of work such as inspection, and the rate of deterioration of parts.

In FIG. 12A, for example, when the rate of deterioration of parts is low in the absence of an alarm or work such as inspection, there is no need to correct the time from the present to the predicted time of alarm generation, so that the amount of correction takes on 1.0. On the other hand, when the rate of deterioration of parts is medium or high in the absence of an alarm but in the presence of work such as inspection, there is need to shorten the time, so that the amount of correction takes on 0.9 or 0.8 according to the rate of deterioration.

Further, in FIG. 12A, for example, when the rate of deterioration of parts is medium in the presence of an alarm and work such as inspection, it can be estimated that there was no failure in any part when the work such as inspection was actually performed, although the alarm was generated. Therefore, when the rate of deterioration of parts is medium in the presence of an alarm and work such as inspection, there is no need to correct the time to the predicted time of alarm generation, so that the amount of correction takes on 1.0. When the rate of deterioration of parts is high in the presence of an alarm and work such as inspection, there is need to shorten the time, so that the amount of correction takes on 0.8. On the other hand, when the rate of deterioration of parts is low in the presence of an alarm but in the absence of work such as inspection, there is no problem in lengthening the time, so that the amount of correction takes on 1.2.

Correction Execution Unit 136

The correction execution unit 136 is a specific example of the first determiner 13 and an example of the first determiner of the present disclosure. The correction execution unit 136 corrects and determines scheduled dates of inspection of the air-conditioning facilities on the basis of a history of degrees of deterioration determined from information that, for each part of the air-conditioning facilities during the past inspections, an inspection worker perceived from the part. Note here that, as mentioned above, the information that the worker perceived from the parts is information to which meanings are attached on the basis of sensory information obtained from the parts through the use of the five senses, somatic sensation, vestibular sensation, and the like of the worker. Examples include "hot", "heavy", "hard", "dirty", "clogged", and the like. Further, the information that the worker perceived from the parts is not information obtained from sensors provided in the air-conditioning facilities. In Embodiment 1, the correction execution unit 136 determines a recommended date of inspection or the number of days to the recommended date of inspection by correcting the number of days from the present to the predicted date of alarm generation with the amount of correction determined by the amount-of-correction determination unit 135. Note here that the recommended date of inspection is a date obtained by correcting the predicted date of alarm generation with the amount of correction determined by the amount-of-correction determination unit 135. The correction execution unit 136 may also calculate an amount of correction to the same part of the same machine using the amount of correction determined for each record of work by the amount-of-correction determination unit 135. This example is described below with reference to drawings.

Figures 13A, 13B:
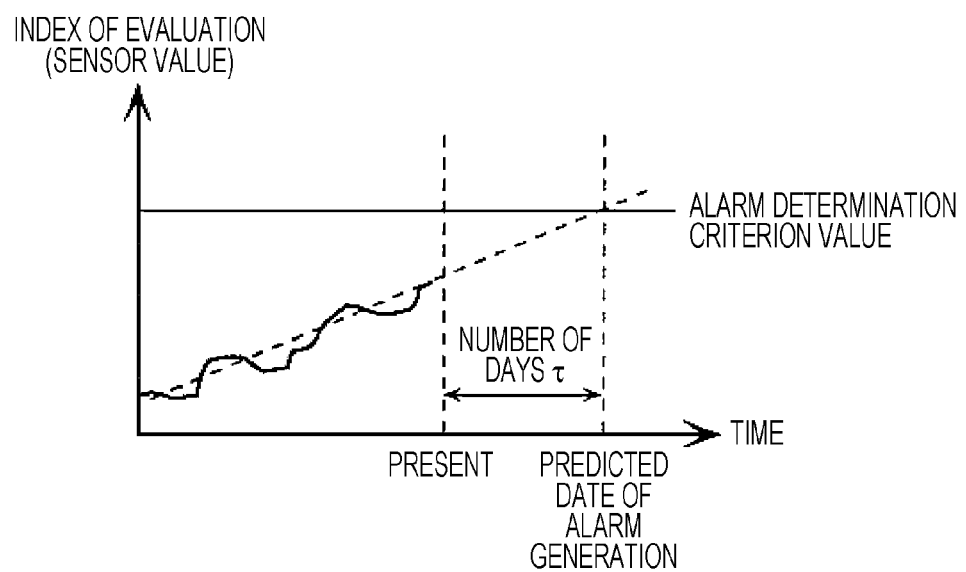
FIG. 13A is a diagram showing an example of an amount of correction determined for each record of work.
FIG. 13B is a conceptual diagram showing the number of days from the present to a predicted date of alarm generation.

FIG. 13A is a diagram showing an example of an amount of correction determined for each record of work. FIG. 13B is a conceptual diagram showing the number of days τ from the present to a predicted date of alarm generation. FIG. 13A shows, as examples, amounts of correction to records of work performed on the same part of the same machine, i.e. a heat exchanger a of an ABS system 1 of a property A shown in FIG. 10. FIG. 13B shows, as an example, the number of days τ from the present to the predicted date of alarm generation. FIG. 13B shows an example in which he time series analytical method is used to predict, as the predicted date of alarm generation, a date when an index of evaluation such as a sensor value reaches an alarm determination criterion value that is a value determined in advance either manually or from past data.

The average value of such amounts of correction determined for the records of work performed on the same part of the same machine as those shown in FIG. 13A is calculated by the correction execution unit 136, for example, according to Eq. (3):

$$\overline{w} = \frac{1}{N}\sum_{k=1}^{N} w_k \qquad (3)$$

where Wk is the amount of correction to the number of days and N is the number of records of work.

It should be noted that the average value of amounts of correction is not limited to being calculated from amounts of correction for each separate one of records of work performed on the same part of the same machine. Amounts of correction pertaining to the same part of the same machine may be calculated using amounts of correction pertaining to a similar machine in a similar environment.

The corrected number of days τ' obtained by correcting the number of days τ shown in FIG. 13B is calculated by the correction execution unit 136 according to Eq. (4) below using the average value of the amounts of correction thus calculated. Note here that the corrected number of days τ' means a margin for the predicted date of alarm generation when an inspection or the like is needed.

$$\tau' = \overline{w}\tau \qquad (4)$$

In this way, the correction execution unit 136 corrects and determines the predicted date of alarm generation, which is a scheduled date of inspection, or the number of days.

Memory 137

The memory 137 is an example of the storage of the present disclosure. The memory 137 stores a degree of deterioration of each part of each of the air-conditioning facilities during the past inspections. The memory 137 is a memory in which to store information and, for example, is a nonvolatile memory such as a hard disk. The memory 137 may store work features including a degree of deterioration extracted by the work feature extraction unit 134 and a history of such work features and may store a program for causing the work feature extraction unit 134, the amount-of-correction determination unit 135, the correction execution unit 136, and the like to perform their functions.

Configuration of Information Terminal 106

As shown in FIG. 6, the information terminal 106 includes a work content production unit 138 and a display unit 139. The information terminal 106 is a terminal including a display. Specifically, the information terminal 106 is a computer including a display. The information terminal 106 may be a personal computer, a mobile terminal, a mobile phone, a smartphone, a tablet terminal, or the like.

Display Unit 139

The display unit 139 is a specific example of the indicator 17 and an example of the indicator of the present disclosure. The display unit 139 is a display that displays information indicating a scheduled date of inspection determined by and transmitted from the inspection management server apparatus 105. The display unit 139 may be a liquid crystal display, a plasma display, or a cathode-ray tube.

Work Content Production Unit 138

The work content production unit 138 is an example of the controller of the present disclosure. The work content production unit 138 causes the display unit 139 to display information indicating a scheduled date of inspection determined by the inspection management server apparatus 105. It should be noted that when the inspection management server apparatus 105 includes a display, the inspection management server apparatus 105 may include the work content production unit 138.

In Embodiment 1, the work content production unit 138 causes the display unit 139 to display information including a predicted date of alarm generation and a recommended date of inspection or the number of days to the recommended date of inspection as acquired by the inspection management server apparatus 105. Moreover, when a user of the information terminal 106 has set a scheduled date of inspection, i.e. a schedule date when an inspection is actually carried out, the work content production unit 138 causes the display unit 139 to display information including the scheduled date of inspection thus set. The work content production unit 138 may notify the information indicating the scheduled date of inspection thus set to an information terminal or the like that is used by a worker who performs maintenance. In this way, the work content production unit 138 produces suggested work contents indicating inspection priorities determined from recommended dates of inspection notified from the inspection management server apparatus 105. It should be noted that the inspection priorities mean an order of priority of inspections.

Figure 14:
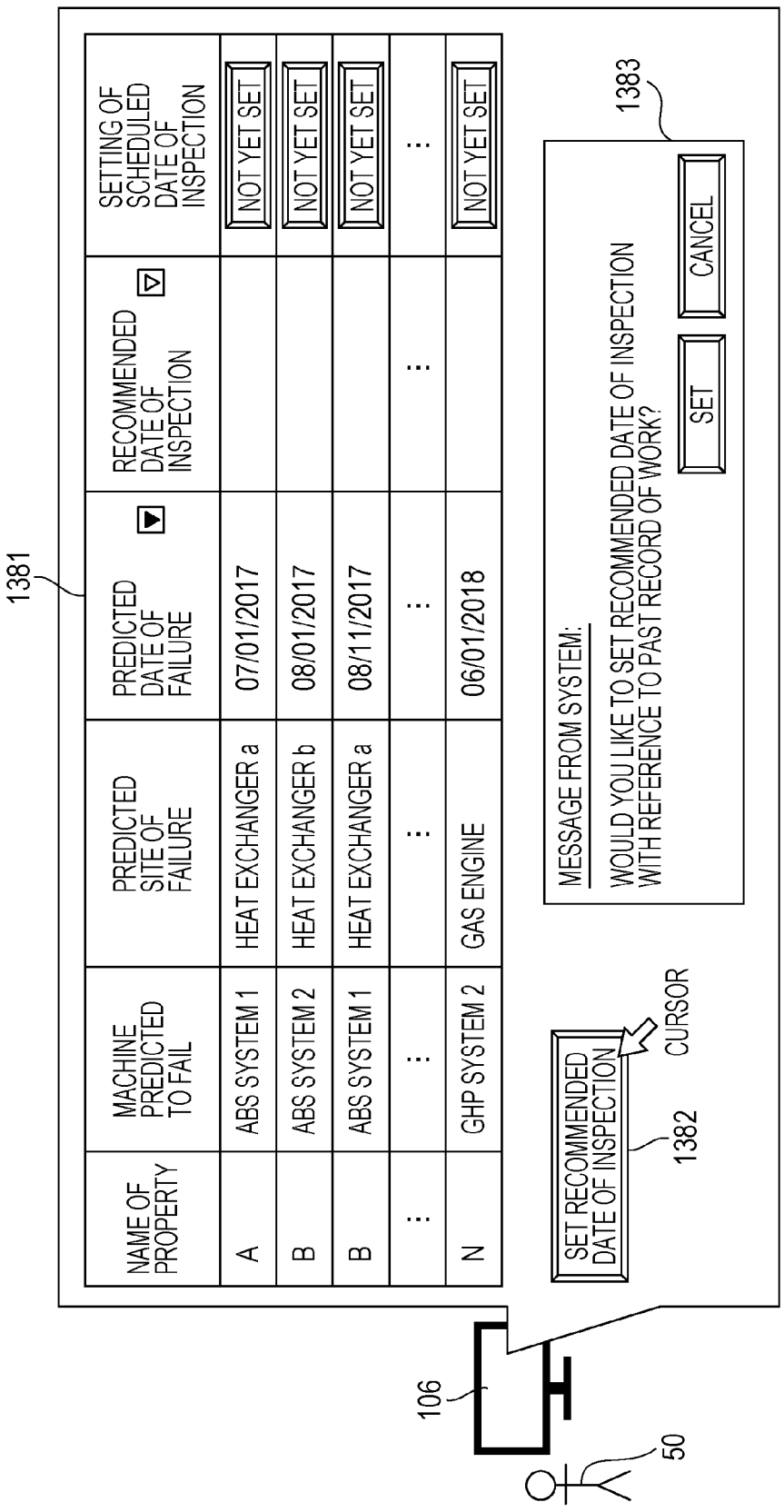
FIG. 14 is a conceptual diagram showing a screen image for setting a recommended date of inspection according to Embodiment 1.

FIG. 14 is a conceptual diagram showing a screen image for setting a recommended date of inspection according to Embodiment 1. The screen image shown in FIG. 14 shows a table 1381 in which the name of the property, the machine predicted to fail, the predicted site of failure, and the predicted date of failure are displayed but the recommended date of inspection is not yet set. Note here that the predicted date of failure is a predicted date of occurrence of failure and a date of alarm generation and therefore means the aforementioned predicted date of alarm generation. Further, this screen image also shows an icon 1382 and an area 1383. The icon 1382 allows a recommended date of inspection to be set by putting the cursor on and selecting the icon 1382.

In the example shown in FIG. 14, the icon 1382 is selected by a user 50 of the information terminal 106, and a message that confirms whether a recommended date of inspection is actually set is displayed in the area 1383. By selecting the "SET" icon displayed in the area 1383, the user 50 of the information terminal 106 can cause the work content production unit 138 to input a recommended date of inspection to the table 1381.

Figure 15:
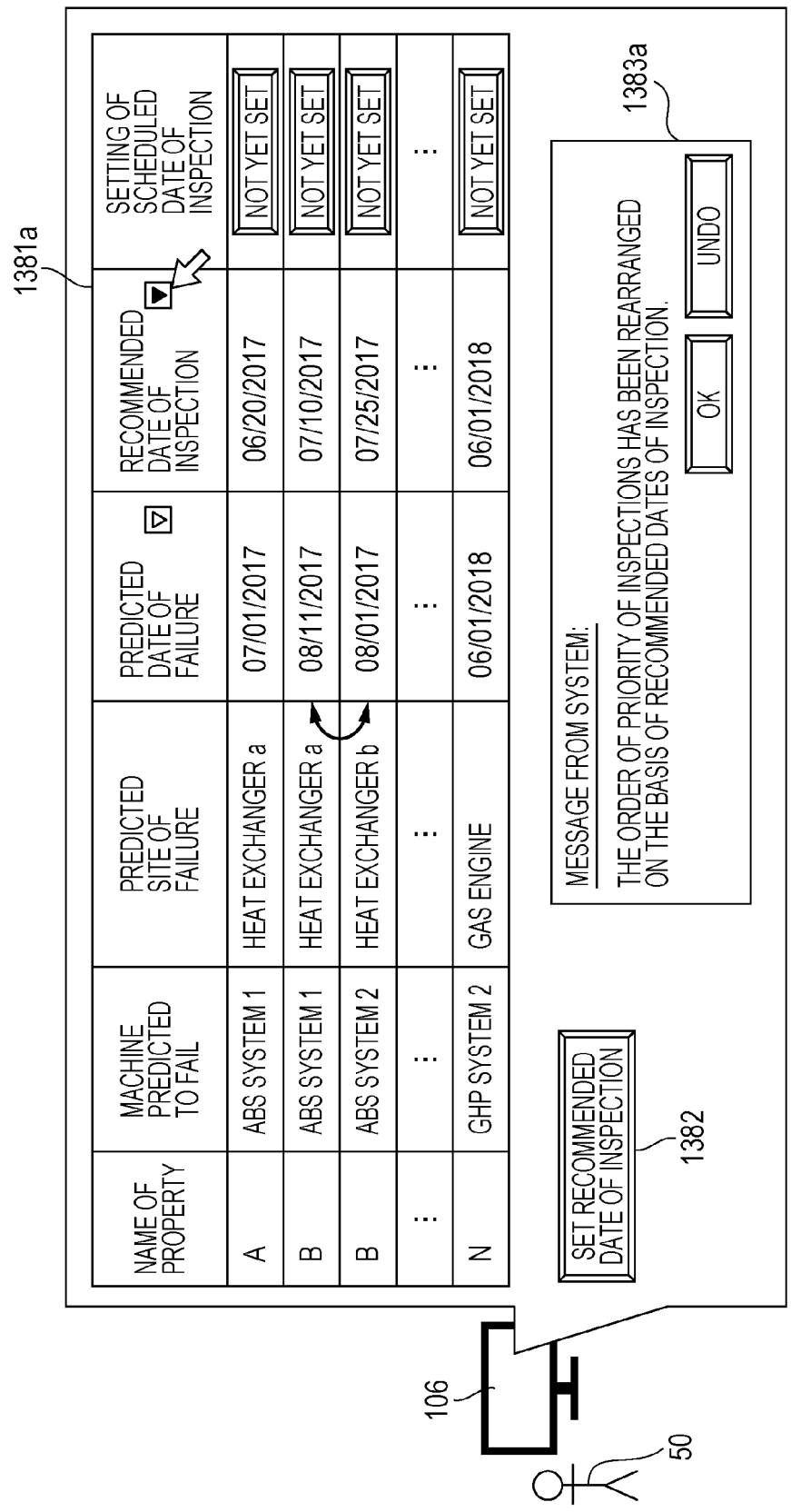
FIG. 15 is a conceptual diagram showing a screen image for changing inspection priorities on the basis of recommended dates of inspection according to Embodiment 1.

FIG. 15 is a conceptual diagram showing a screen image for changing inspection priorities on the basis of recommended dates of inspection according to Embodiment 1. It should be noted that elements that are identical to those of FIG. 14 are given the same reference numerals and are not described in detail here. The screen image shown in FIG. 15 shows a table 1381*a* obtained by inputting recommended dates of inspection to the table 1381 shown in FIG. 14. Further, this screen image also shows an icon for rearranging the recommended dates of inspection of the table 1381*a*. By putting the cursor on and selecting the icon for rearranging the recommended dates of inspection of the table 1381*a*, the user 50 of the information terminal 106 can rearrange the rows of the table 1381*a* on the basis of the recommended dates of inspection.

In the example shown in FIG. 15, the rows of the table 1381*a* have been rearranged on the basis of the recommended dates of inspection by the user 50 of the information terminal 106. Therefore, in the area 1383*a*, a display is performed which shows that the inspection priorities, i.e. the order of priority of inspections, have been rearranged on the basis of the recommended dates of inspection. It should be noted that the screen image shown in FIG. 15 also shows an icon for rearranging the predicted dates of failure. That is, as the inspection priorities, i.e. the order of priority of inspections, both the predicted dates of failure and the recommended dates of inspection can be optionally selected.

Figure 16:
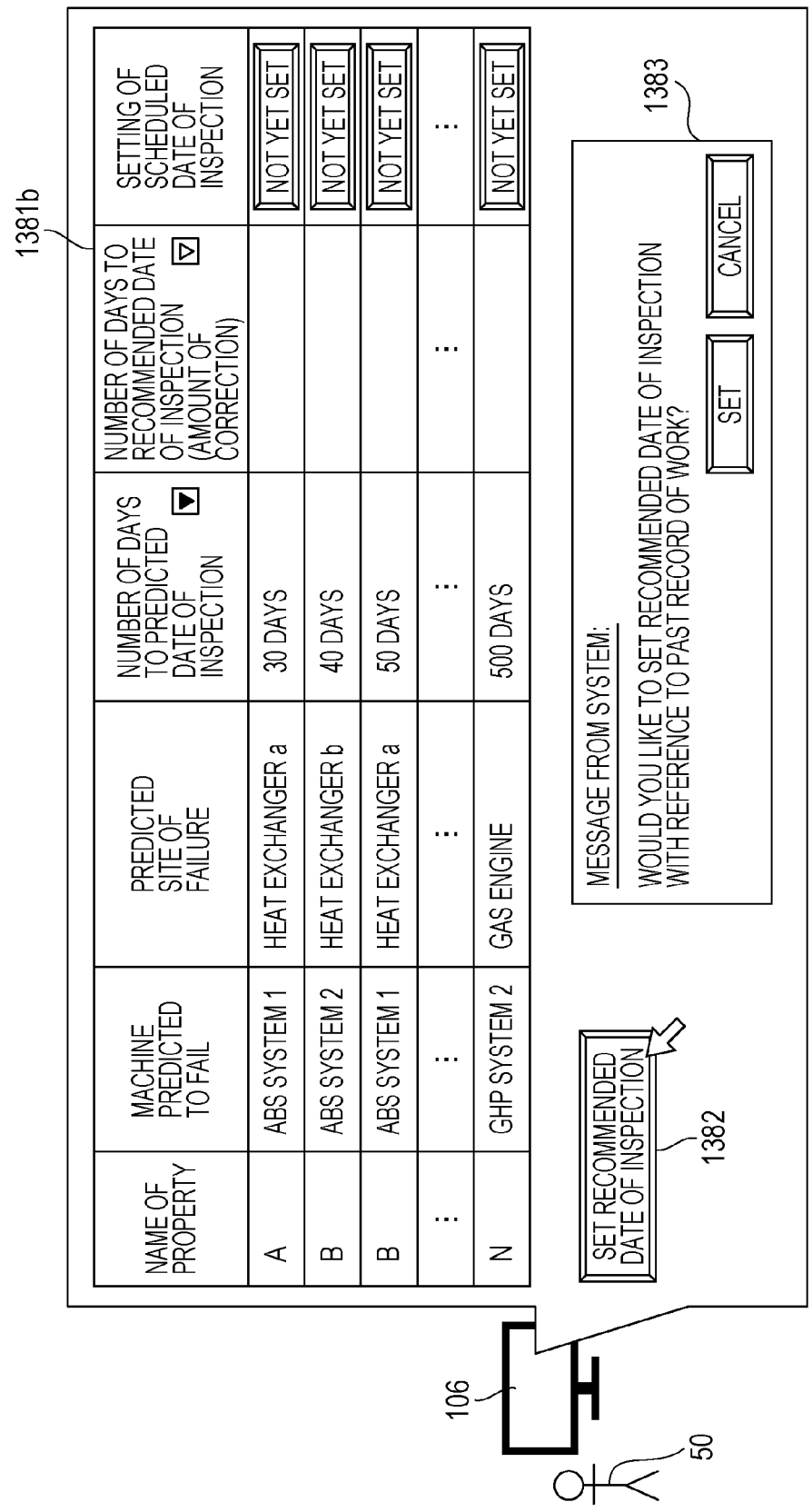
FIG. 16 is a conceptual diagram showing a screen image for setting a recommended date of inspection according to Embodiment 1.

FIG. 16 is a conceptual diagram showing a screen image for setting a recommended date of inspection according to Embodiment 1. It should be noted that elements that are identical to those of FIG. 14 are given the same reference numerals and are not described in detail here. FIG. 16 shows a table 1381*b* that is different from the table 1381 shown in FIG. 14 in that the items "predicted date of failure" and "recommended date of inspection" have been replaced by the number of days to the predicted date of failure and the number of days to the recommended date of inspection.

Figure 17:
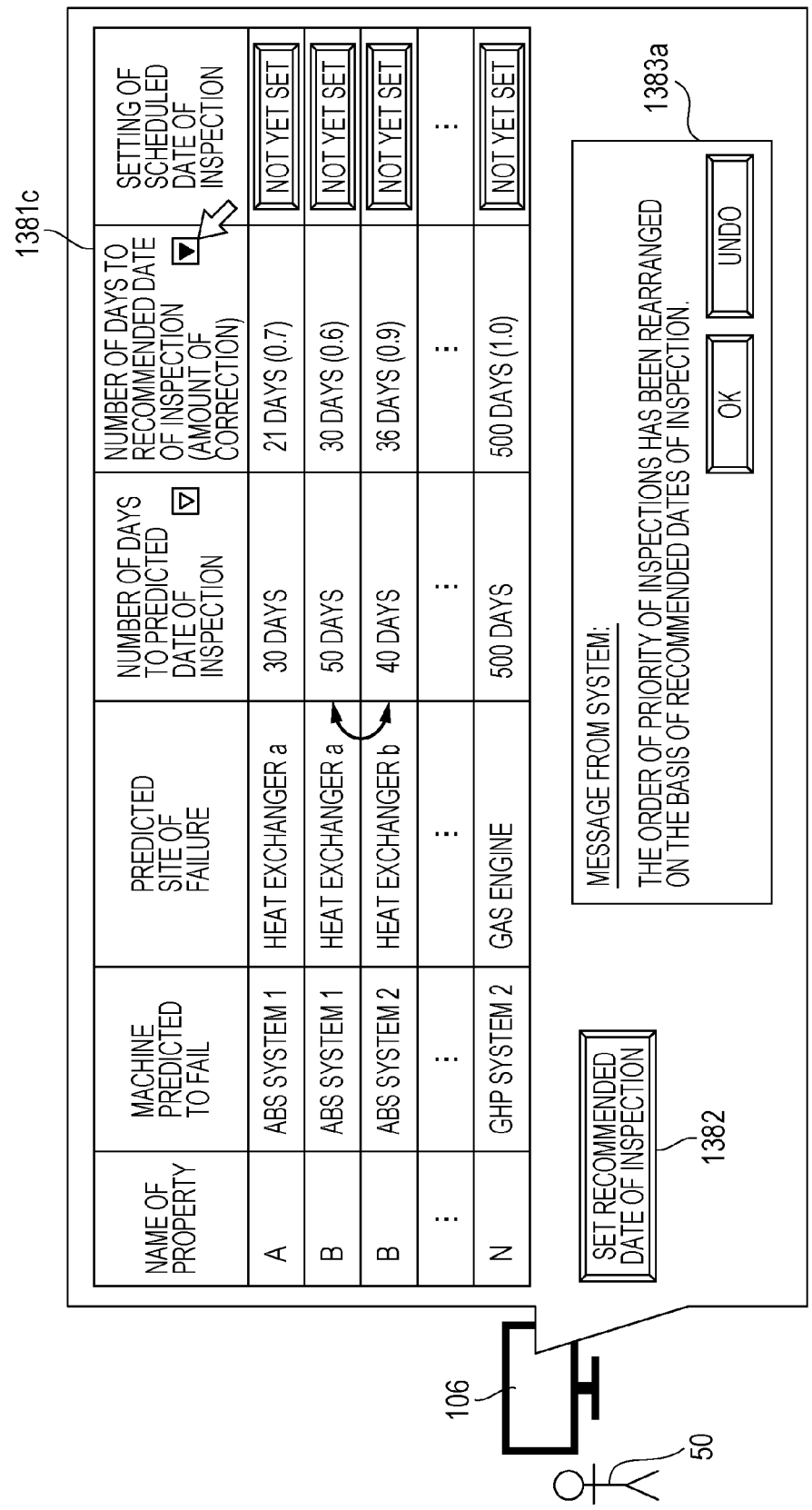
FIG. 17 is a conceptual diagram showing a screen image for changing inspection priorities on the basis of the numbers of days to recommended dates of inspection according to Embodiment 1.

FIG. 17 is a conceptual diagram showing a screen image for changing inspection priorities on the basis of the numbers of days to recommended dates of inspection according to Embodiment 1. It should be noted that elements that are identical to those of FIG. 15 are given the same reference numerals and are not described in detail here. FIG. 17 shows a table 1381*c* that is different from the table 1381*a* shown in FIG. 15 in that the item "recommended date of inspection" has been replaced by the number of days to the recommended date of inspection. That is, as the inspection priorities, i.e. the order of priority of inspections, both the numbers of days to the predicted dates of failure and the numbers of days to the recommended dates of inspection can be optionally selected.

Figure 18:
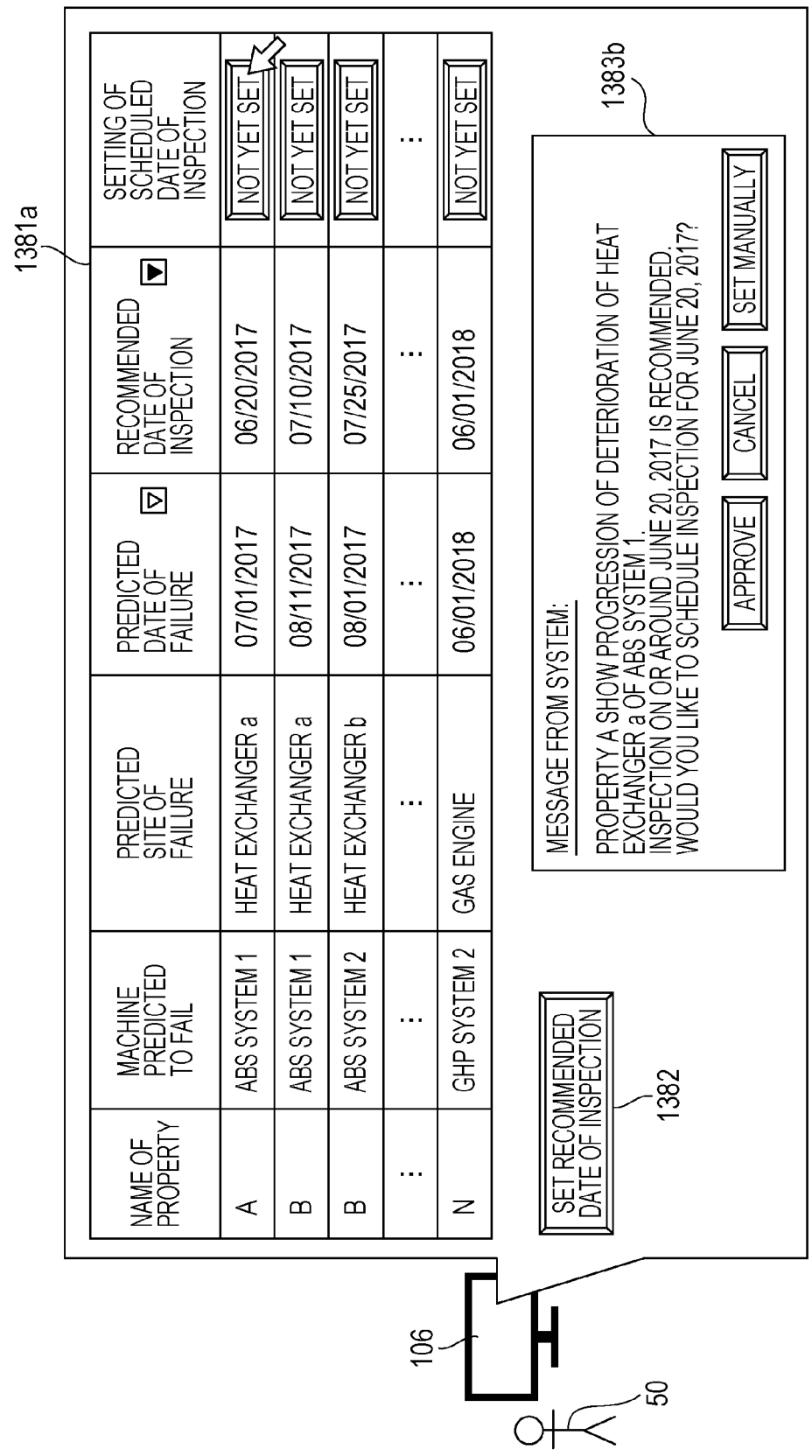
FIG. 18 is a conceptual diagram showing a screen image for setting a scheduled date of inspection on the basis of a recommended date of inspection according to Embodiment 1.

FIG. 18 is a conceptual diagram showing a screen image for setting a scheduled date of inspection on the basis of a recommended date of inspection according to Embodiment 1. It should be noted that elements that are identical to those of FIG. 15 are given the same reference numerals and are not described in detail here. As with the screen image shown in FIG. 15, the screen image shown in FIG. 18 is one obtained by rearranging the rows of the table 1381*a* on the basis of the recommended dates of inspection. Therefore, in the area 1383*b*, a message, or suggested work contents, is displayed which recommends setting a recommended date of inspection as a scheduled date of inspection for a property whose recommended date of inspection is close to the present. It should be noted that when the recommended date of inspection is inconvenient, for example, when work such as inspection cannot be conducted on the recommended date of inspection, the user 50 of the information terminal 106 may manually set a scheduled date of inspection.

Figure 19:
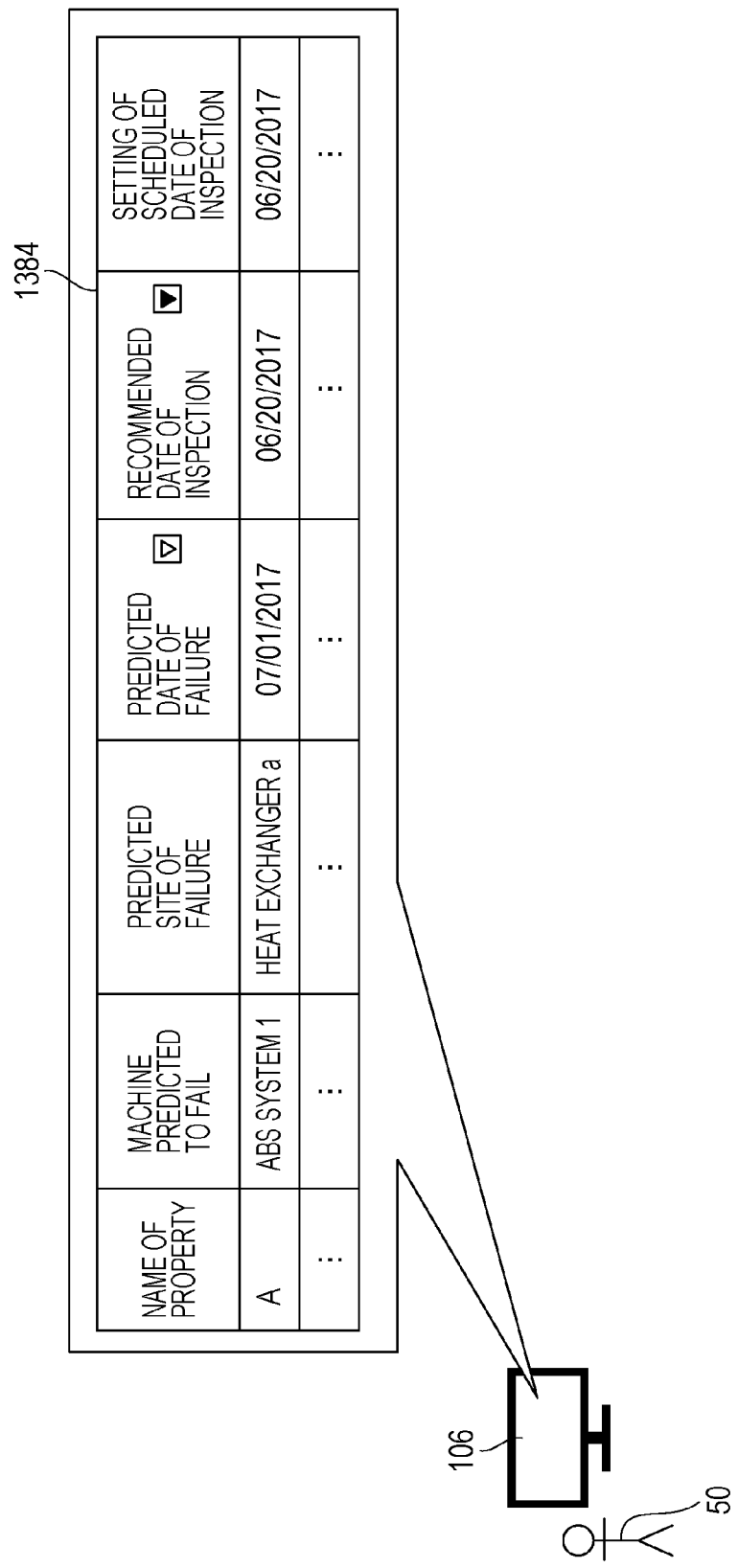
FIG. 19 is a conceptual diagram showing a screen image that is displayed when a scheduled date of inspection has been set according to Embodiment 1.
Figure 20:
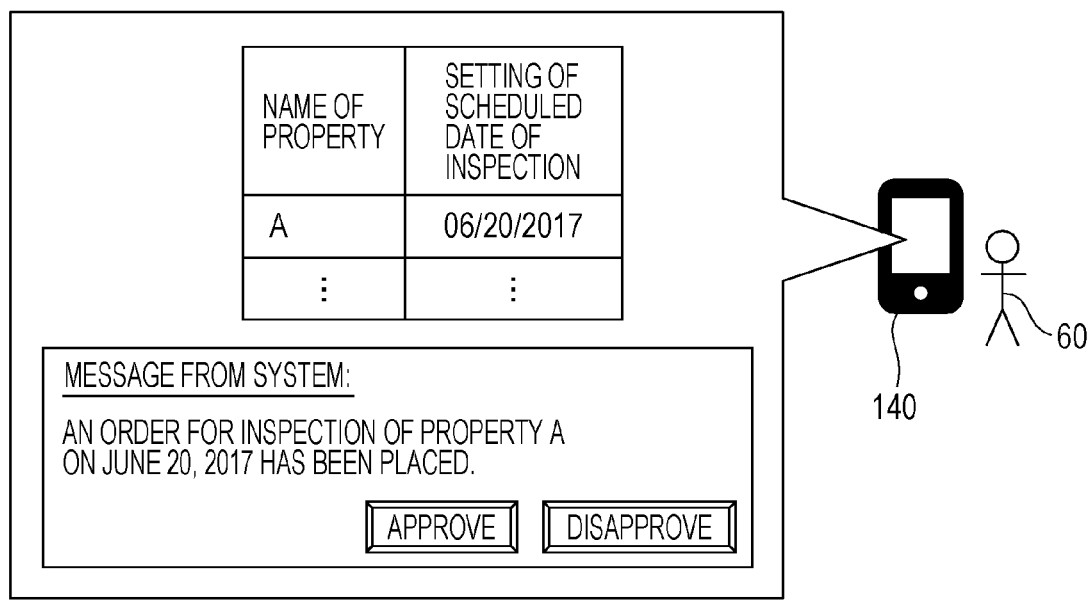
FIG. 20 is a conceptual diagram showing a screen image by which a worker is notified of a scheduled date of inspection according to Embodiment 1.

FIG. 19 is a conceptual diagram showing a screen image that is displayed when a scheduled date of inspection has been set according to Embodiment 1. FIG. 20 is a conceptual diagram showing a screen image by which a worker is notified of a scheduled date of inspection according to Embodiment 1. When a scheduled date of inspection has been set in the table 1381*a* shown in FIG. 18, the display unit 139 displays a table 1384 shown in such a screen image in which a scheduled date of inspection has been set as that shown in FIG. 19. Moreover, for example, the work content production unit 138 notifies an information terminal 140 of a worker 60, either automatically or under instructions from the user 50 of the information terminal 106, of an order for inspection including the suggested work contents, i.e. the scheduled date of inspection and the like, of the screen image shown in FIG. 20. The information terminal 140 is a terminal including a display. The information terminal 140 may be a personal computer, a mobile terminal, a mobile phone, a smartphone, a tablet terminal, or the like.

Operation of Inspection Management System 102

Figure 21A:
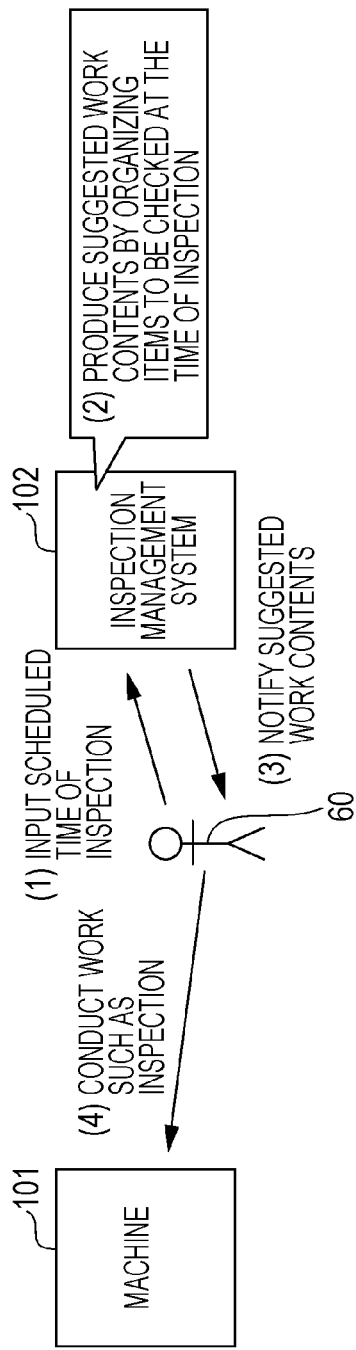
FIG. 21A is a diagram showing an overview of an operation at the time of a periodic inspection according to Embodiment 1.
Figure 21B:
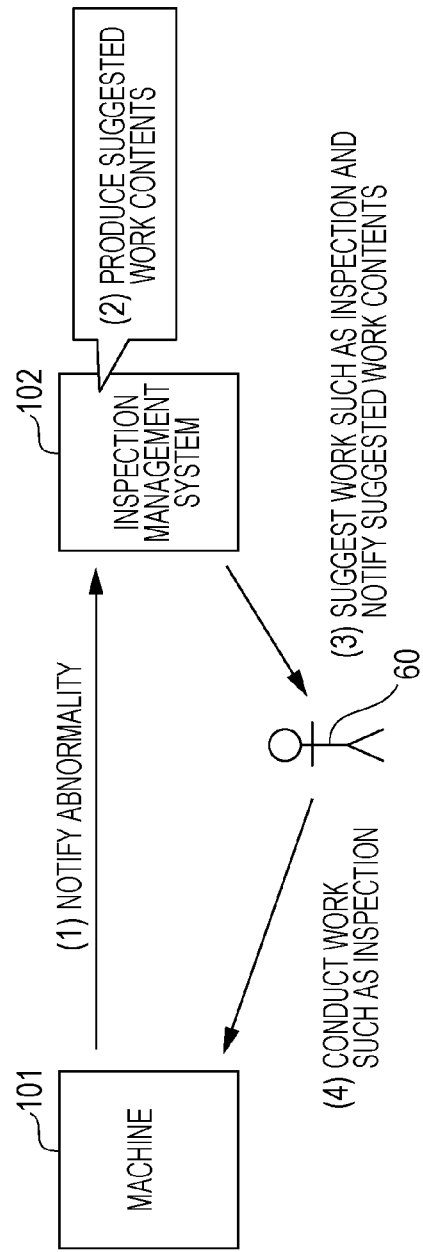
FIG. 21B is a diagram showing an overview of an operation at the time of notification of an abnormality according to Embodiment 1.

The following describes an operation that is performed by the inspection management system 102. It should be noted that, for simplification of explanation, the following describes an operation that is performed on one machine 101 such as an air-conditioning facility. As shown in FIGS. 21A and 21B, there are two possible examples of operations that the inspection management system 102 performs.

FIG. 21A is a diagram showing an overview of an operation at the time of a periodic inspection according to Embodiment 1. First, a worker 60 who performs a maintenance service 103 inputs a scheduled time of inspection to the inspection management system 102 in order to conduct an inspection of a machine 101. Note here that the inspection is a piece of work by which the worker 60 maintains the machine 101, and entails a piece of work of performing inspections, repairs, or maintenance on an as-needed basis. Then, the inspection management system 102 produces suggested work contents by organizing items to be checked at the time of the inspection. The inspection management system 102 notifies the worker 60 of the suggested work contents thus produced. This allows the worker 60 to conduct work such as inspection of the machine 101 in accordance with the suggested work contents. The result of the work is sent as a record of work to the inspection management system 102. The inspection management system 102 produces suggested work contents on the basis of records of work including this record of work. It should be noted that it is not always the case that the worker 60 inputs a scheduled time of inspection to the inspection management system 102 in order to conduct an inspection of the machine 101. As mentioned above, a user of the inspection management server apparatus 105 of the inspection management system 102 may input a scheduled time of inspection.

FIG. 21B is a diagram showing an overview of an operation at the time of notification of an abnormality according to Embodiment 1. FIG. 21B shows an overview of a process that is performed if need arises for work such as inspection upon notification of an abnormality in a machine 101. First, upon notification of an abnormality in a machine 101, the inspection management system 102 produces suggested work contents. Then, the inspection management system 102 suggests inspection or the like to a worker 60 who performs a maintenance service 103, and notifies the suggested work contents thus produced. The worker 60 performs work, i.e. maintenance such as inspections and repairs, on the machine 101 in accordance with the suggested work contents thus notified. The result of the work is sent as a record of work to the inspection management system 102. The inspection management system 102 produces suggested work contents on the basis of records of work including this record of work.

The following describes details of the operation at the time of a periodic inspection and the operation at the time of notification of an abnormality.

Figure 22A:
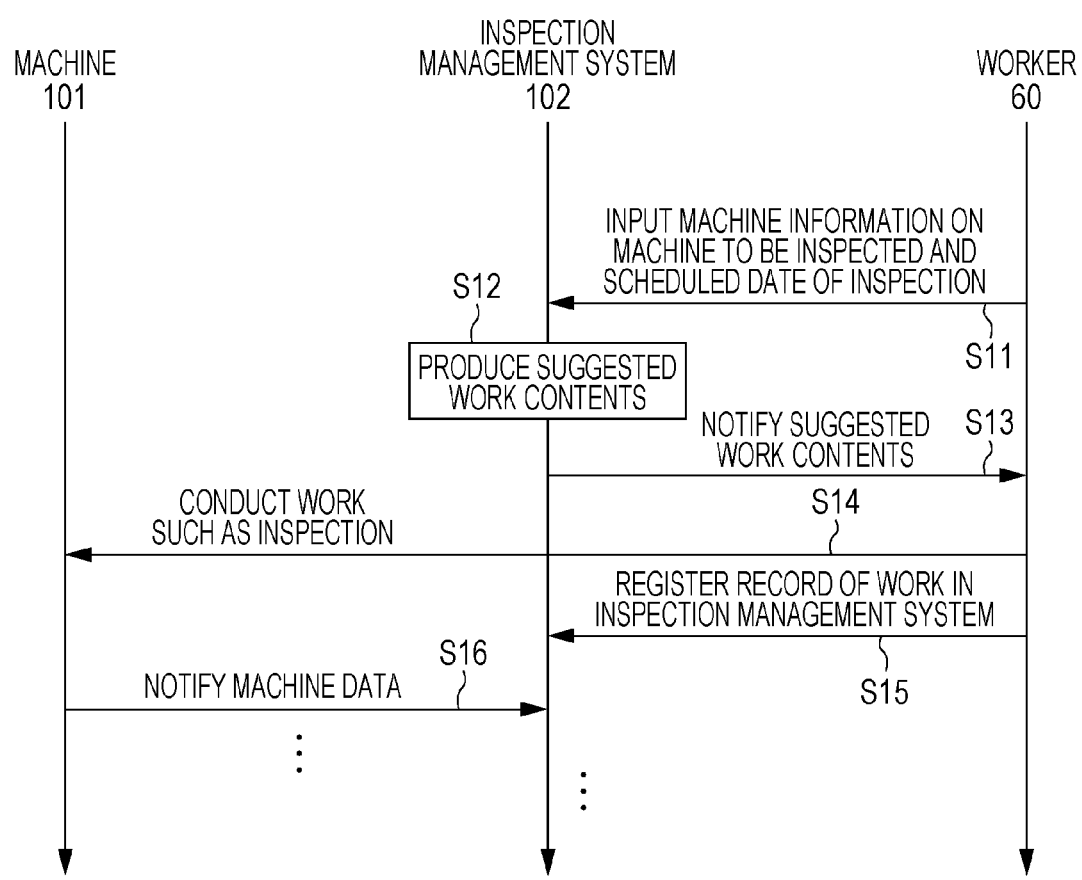
FIG. 22A is a sequence diagram showing details of an example operation at the time of a periodic inspection according to Embodiment 1.

FIG. 22A is a sequence diagram showing details of an example operation at the time of a periodic inspection according to Embodiment 1.

First, a worker 60 who performs a maintenance service 103 inputs, to the inspection management system 102, machine information on a machine 101 to be inspected and a scheduled date of inspection (S11). Upon acquiring the machine information and the scheduled date of inspection, the inspection management system 102 produces suggested work contents by organizing items to be checked at the time of the inspection (S12). In Embodiment 1, the inspection management system 102 produces, on the basis of the past records of work and the past machine data on the machine 101, a scheduled date of inspection and suggested work contents that the worker 60 should perform on the scheduled date of inspection. Then, the inspection management system 102 notifies the worker 60 of the suggested work contents thus produced. After that, the worker 60 conducts work such as inspection in accordance with the suggested work contents notified in S13 (S14). Then, a record of work in which the contents of work such as inspection or the like are recorded is produced, and the record of work thus produced is registered in the inspection management system 102 (S15). It should be noted that the machine 101 periodically notifies the inspection management system 102 of machine data.

Figure 22B:
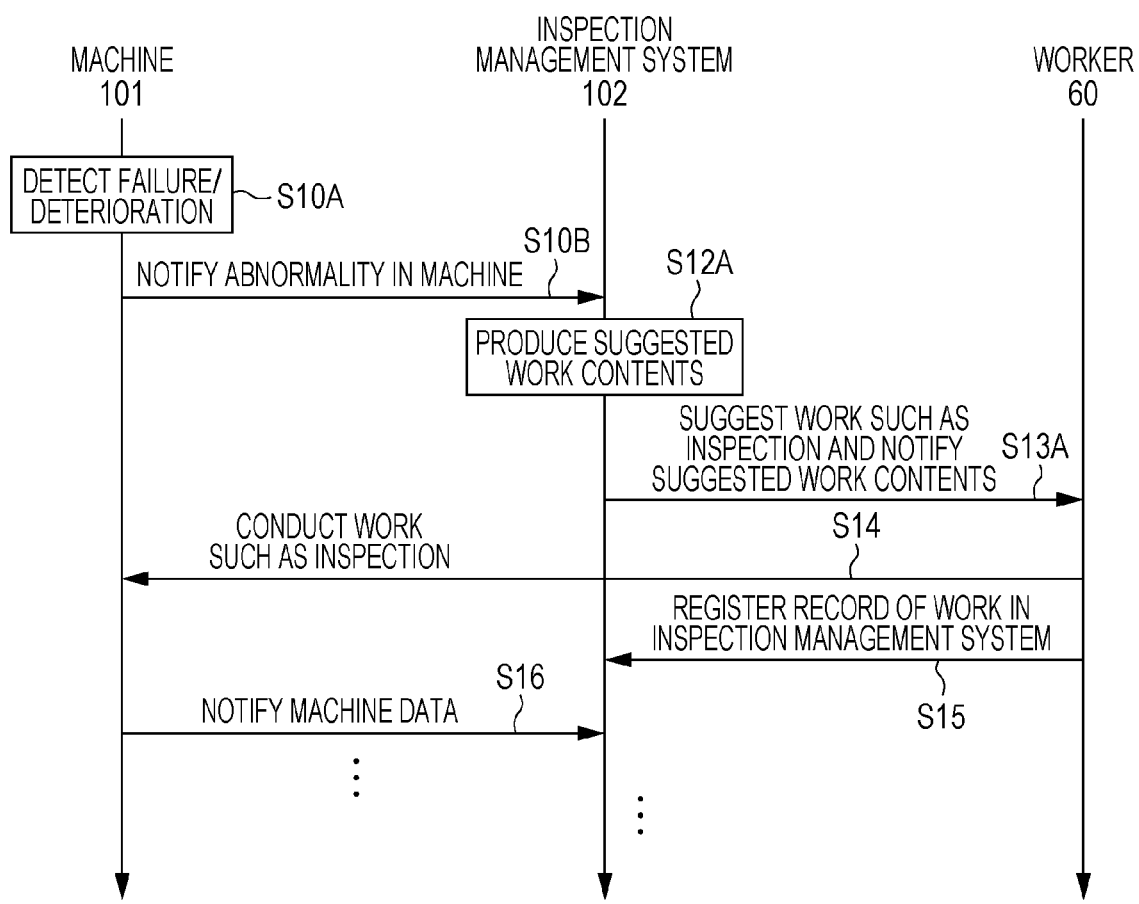
FIG. 22B is a sequence diagram showing details of an example operation at the time of notification of an abnormality according to Embodiment 1.

FIG. 22B is a sequence diagram showing details of an example operation at the time of notification of an abnormality according to Embodiment 1. It should be noted that elements that are identical to those of FIG. 22A are given the same reference numerals and are not described in detail here.

First, when a machine 101 detects a failed or deteriorated part with a sensor or the like installed therein (S10A), the machine 101 notifies the inspection management system 102 of the abnormality in the machine 101 (S10B). Upon acquiring the abnormality in the machine 101, the inspection management system 102 produces suggested work contents by organizing items to be checked at the time of inspection (S12A). Then, the inspection management system 102 suggests inspection or the like to a worker 60 who performs a maintenance service 103, and notifies the suggested work contents thus produced (S13A).

The following describes a process that is performed by the inspection management system 102 according to Embodiment 1.

Figure 23:
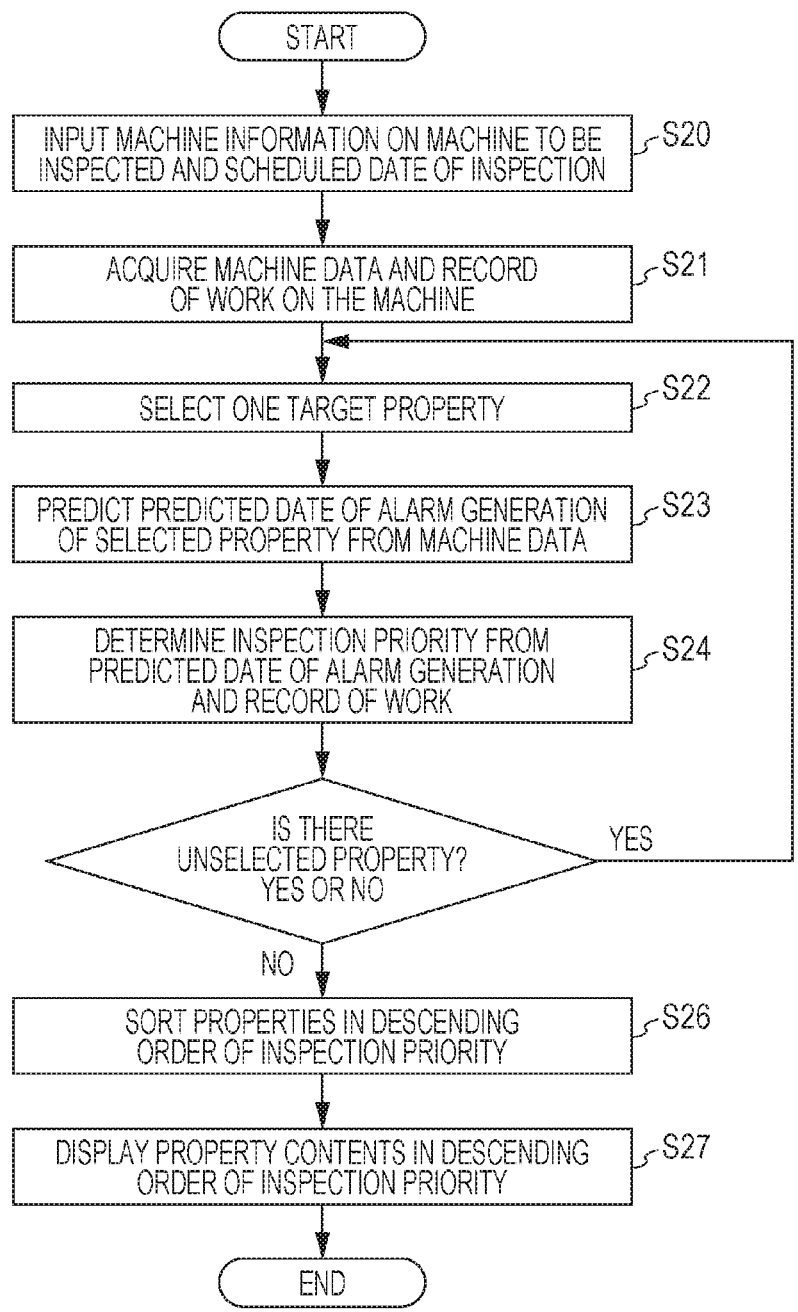
FIG. 23 is a flow chart showing details of a process that is performed by the inspection management system according to Embodiment 1.

FIG. 23 is a flow chart showing details of a process that is performed by the inspection management system 102 according to Embodiment 1. FIG. 23 shows a process that is performed by the inspection management system 102 at the time of a periodic inspection.

First, a worker who conducts an inspection or the like of a machine 101 or a user of the inspection management server apparatus 105 of the inspection management system 102 inputs, to the inspection management system 102, machine information on the machine 101 to be inspected and a scheduled date of inspection (S20). Then, the inspection management system 102 acquires machine data and a record of work on the machine 101 (S21).

Next, the inspection management system 102 selects one target property from among the properties in the record of work (S22), predicts a predicted date of alarm generation of the selected property from the machine data (S23), and determines an inspection priority from the predicted date of alarm generation and the record of work (S24). If there is an unselected property, the process is redone from S22, and if there is no unselected property, the process proceeds to S26.

Next, the inspection management system 102 sorts the properties in descending order of inspection priority (S26) and causes the display to display the property contents of the properties in descending order of inspection priority (S27).

Figure 24:
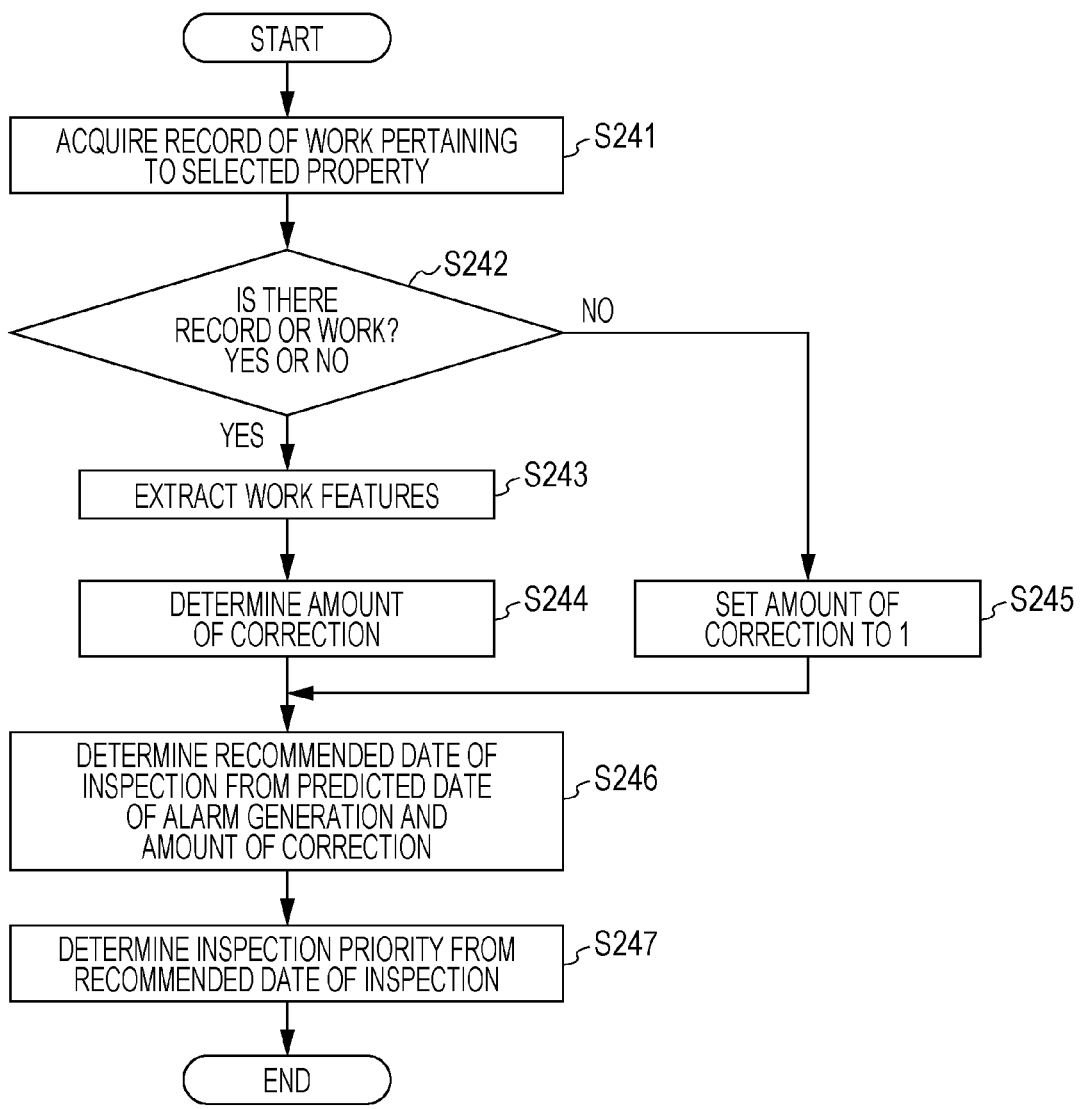
FIG. 24 is a flow chart showing details of the process in S24 shown in FIG. 23.

FIG. 24 is a flow chart showing details of the process in S24 shown in FIG. 23. The process shown in FIG. 24 is performed by the inspection management server apparatus 105 and the information terminal 106 of the inspection management system 102.

In S24 shown in FIG. 23, first, the work feature extraction unit 134 of the inspection management server apparatus 105 acquires, from the record-of-work storage unit 133, a record of work pertaining to the property selected in S22 (S241). If there is a record of work that can be acquired ("YES" in S242), the work feature extraction unit 134 of the inspection management server apparatus 105 extracts work features (S243). For example, the work feature extraction unit 134 extracts, from the record of work thus acquired, work features including a degree of deterioration such as a rate of deterioration of parts of the machine 101.

Next, the amount-of-correction determination unit 135 of the inspection management server apparatus 105 determines an amount of correction (S244). For example, the amount-of-correction determination unit 135 determines an amount of correction to the number of days from the present to the predicted date of alarm generation.

Next, the correction execution unit 136 of the inspection management server apparatus 105 determines a recommended date of inspection from the predicted date of alarm generation and the amount of correction (S246). For example, the correction execution unit 136 determines the recommended date of inspection by correcting the number of days from the present to the predicted date of alarm generation with the amount of correction determined in S244.

Next, the work content production unit 138 of the information terminal 106 determines an inspection priority from the recommended date of inspection determined in S246 (S247). For example, the work content production unit 138 determines an inspection priority from the recommended date of inspection notified from the inspection management server apparatus 105 and produces suggested work contents indicating the inspection priority thus determined.

It should be noted that if, in S242, there is no record of work that can be acquired ("NO" in S242), the amount-of-correction determination unit 135 of the inspection management server apparatus 105 determines to set the amount of correction to "1", i.e. determines not to make any correction (S245). The subsequent processes, which have been described above, are not described here.

It should be noted that the processes shown in FIGS. 21A, 22B, 23, and 24 are performed at appropriate timings. That is, these processes do not need to be successively performed.

Effects and the Like of Inspection Management System 102

Such a configuration and operation of the inspection management system 102 correct a predicted date of alarm generation or a predicted time of alarm generation on the basis of the features of work contents included in a record of work. This makes it possible to obtain a recommended date of inspection that is a predicted date of alarm generation or a predicted time of alarm with reduced variation, thus making it possible to accurately determine an order of priority of sites on which inspections or the like are to be performed. This in turn makes it possible to achieve a shortening of working hours of inspection or the like that the worker 60 perform on a machine 101 such as an air-conditioning facility and a reduction in the number of visits for work such as inspection of the machine 101. Therefore, the inspection management system 102 according to Embodiment 1 can further improve the efficiency of inspection management of air-conditioning facilities.

Furthermore, such a configuration and operation of the inspection management system 102 make it possible to determine a recommended date of inspection that is a date obtained by correcting a predicted date of alarm generation, thus allowing a failure diagnosis not based on experience of the worker 60 and making it possible to conduct efficient maintenance operations of work such as inspection.

Modification of Embodiment 1

Although Embodiment 1 has described the work content production unit 138 determining inspection priorities, i.e. an order of priority of inspections, according to recommended dates of inspection, this does not imply any limitation. The work content production unit 138 may determine inspection priorities so that parts or sites whose recommended dates of inspection are close together may be simultaneously inspected, provided the parts or sites belong to the same one of the properties included in a record of work. The following describes this modification.

Figure 25:
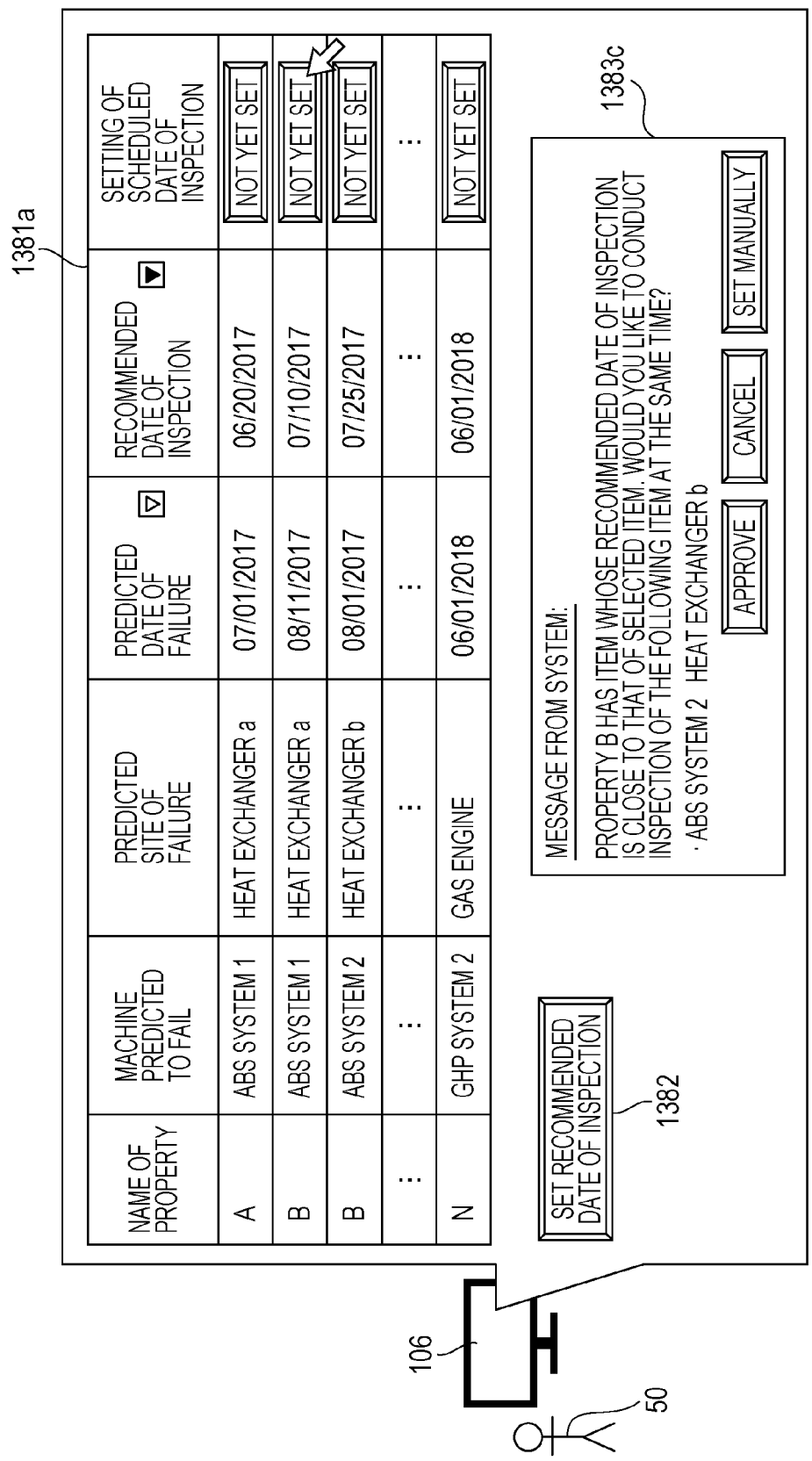
FIG. 25 is a conceptual diagram showing a screen image displaying an item whose recommended date of inspection is close according to a modification of Embodiment 1.

FIG. 25 is a conceptual diagram showing a screen image displaying an item whose recommended date of inspection is close according to the present modification. It should be noted that elements that are identical to those of FIG. 18 are given the same reference numerals and are not described in detail here. The screen image shown in FIG. 25 differs from the screen image shown in FIG. 18 in terms of a message that is displayed in an area 1383c. In the area 1383c, a message, i.e. a suggested work item, that recommends simultaneously inspecting an item whose recommended date of inspection is close is displayed.

Figure 26:
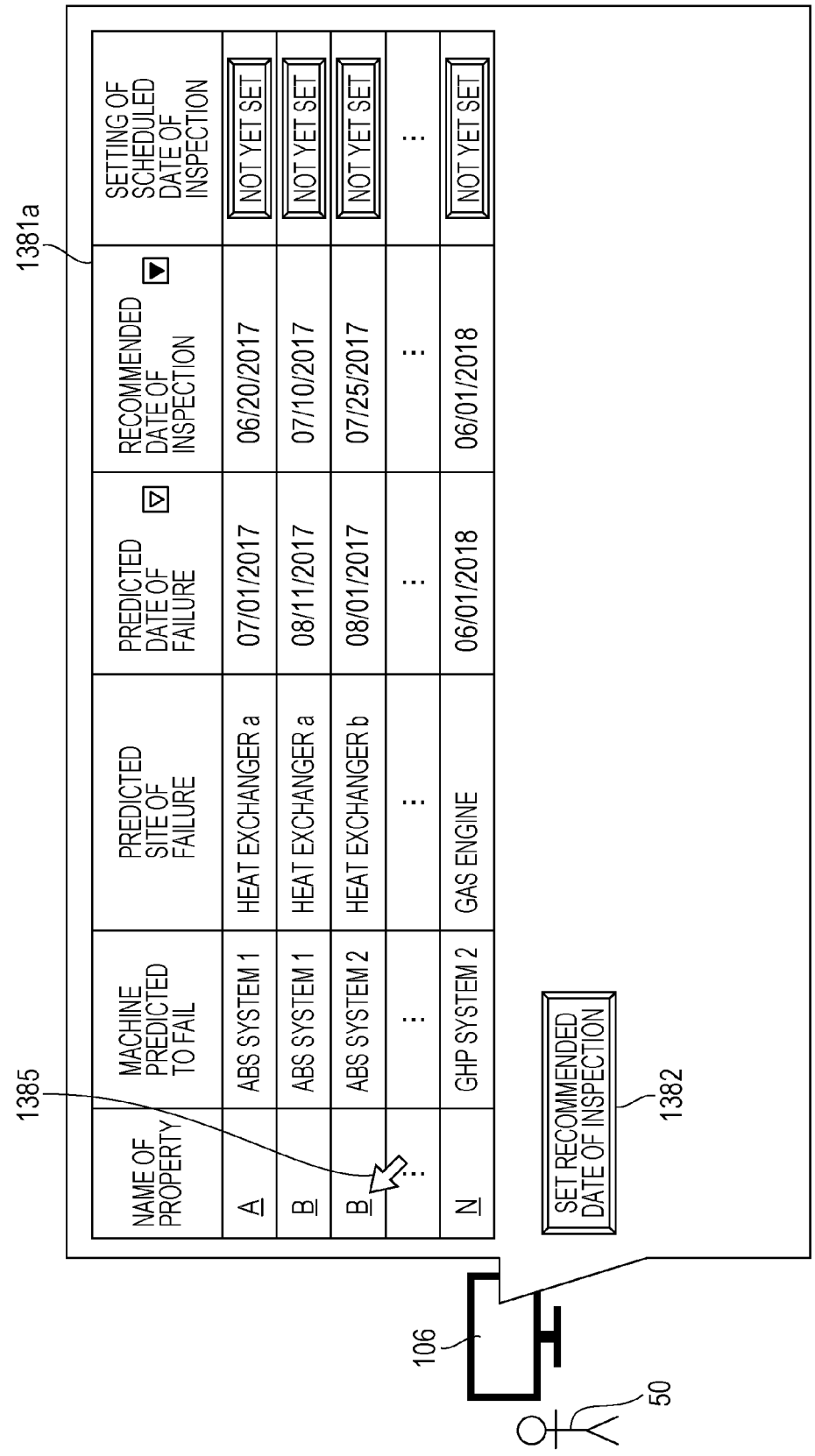
FIG. 26 is a conceptual diagram showing a screen image for forming a group for each property by selecting the name of that property according to the modification of Embodiment 1.
Figure 27:
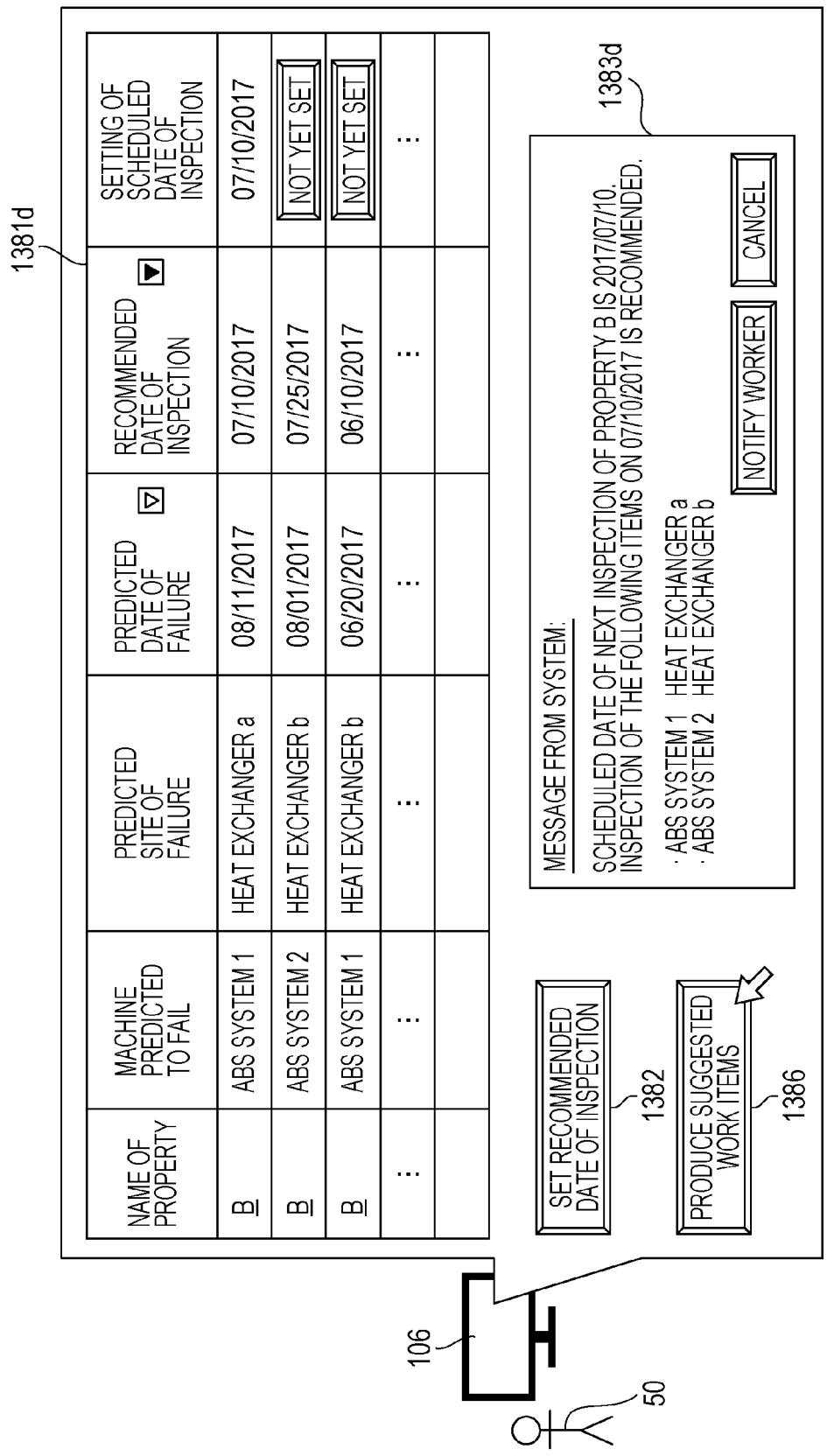
FIG. 27 is a conceptual diagram showing a screen image for forming a group for each property by selecting the name of that property according to the modification of Embodiment 1.

FIGS. 26 and 27 are each a conceptual diagram showing a screen image for forming a group for each property by selecting the name of that property according to the present modification. It should be noted that elements that are identical to those of FIG. 25 are given the same reference numerals and are not described in detail here. The screen image shown in FIG. 26 differs from the screen image shown in FIG. 25 in that the former does not show the area 1383c. The screen image shown in FIG. 27 differs from the screen image shown in FIG. 26 in terms of arrangement of the names of the properties shown in a table 1381d, a message that is shown in an area 13836d, and addition of an icon 1386 that allows a suggested work item to be produced.

As shown in FIG. 26, the user 50 of the information terminal 106 selects a property named B by putting a cursor 1385 on the name of the property in the table 1381a. This forms a group for each property as shown in the table 1381d of FIG. 27. Forming and displaying a group for each property makes it easy for the user 50 of the information terminal 106 to compare the recommended dates of inspection of sites of the same property.

Further, with a group formed for each property as shown in the table 1381d of FIG. 27, the user 50 of the information terminal 106 may select the icon 1386 to cause the work content production unit 138 to produce suggested work items. Moreover, when the icon 1386 is selected, the work content production unit 138 produces and displays a message, or suggested work items, that recommends simultaneously inspecting items of the same property whose recommended dates of inspection are close together, as shown in the area 1383d. It should be noted that the work content production unit 138 may present or display the suggested work items in order of proximity of the recommended dates of inspection.

When the user 50 of the information terminal 106 selects the icon "NOTIFY WORKER" shown in the area 1383d, the work content production unit 138 may notify information indicating the scheduled date of inspection thus set to an information terminal or the like that is used by a worker who performs maintenance.

Figure 28:
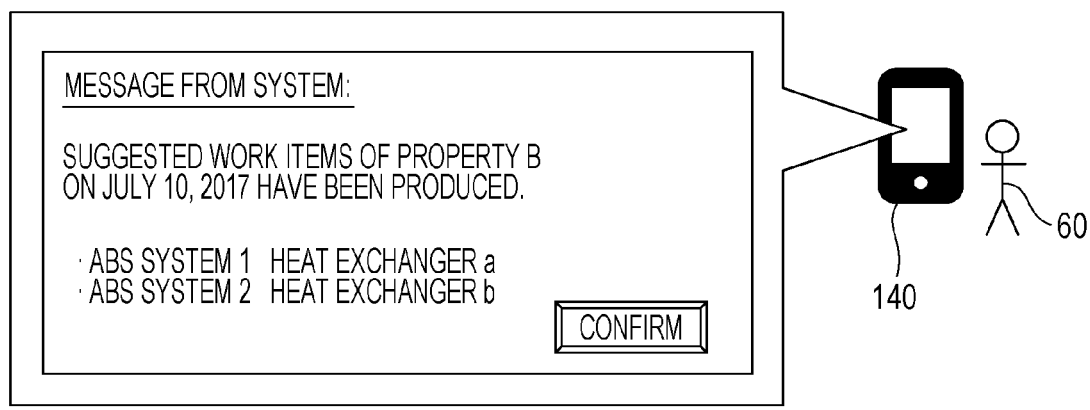
FIG. 28 is a conceptual diagram showing a screen image by which a worker is notified of suggested work items according to the modification of Embodiment 1.

FIG. 28 is a conceptual diagram showing a screen image by which a worker is notified of suggested work items according to the present modification. When the icon "NOTIFY WORKER" shown in the area 1383d of FIG. 27 is selected, the work content production unit 138 notifies the information terminal 140 of the worker 60 of the suggested work items of the screen image shown for example in FIG. 28.

Embodiment 2

Embodiment 2 describes an example in which priorities of work items that are performed on the air-conditioning facility to be inspected are corrected and determined in consideration of the frequency of occurrence of past abnormalities in each part of the air-conditioning facilities. The following gives descriptions with a focus on differences from Embodiment 1. Further, elements that are identical to those shown in the drawings with reference to which Embodiment 1 has been described are given the same reference numerals and are not described in detail below.

Configuration of Inspection Management System 102A

Figure 29:
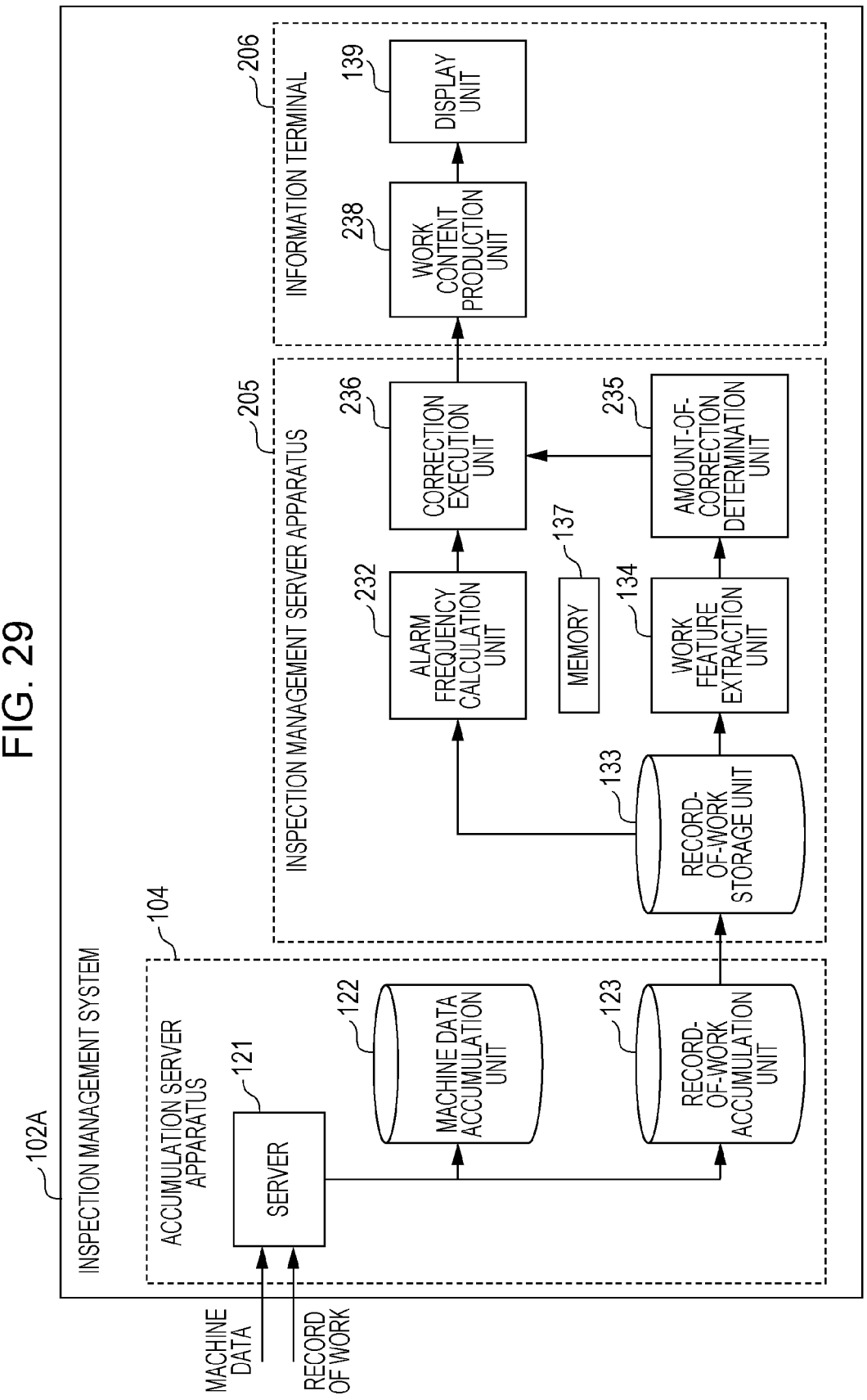
FIG. 29 is a block diagram of an inspection management system according to Embodiment 2.

FIG. 29 is a block diagram of an inspection management system 102A according to Embodiment 2.

As shown in FIG. 29, the inspection management system 102A includes an accumulation server apparatus 104, an inspection management server apparatus 205, and an information terminal 206.

Configuration of Inspection Management Server Apparatus 205

The inspection management server apparatus 205 differs from the inspection management server apparatus 105 shown in FIG. 6 in that the former does not include the machine data storage unit 131 or the date-of-alarm-generation prediction unit 132, further includes an alarm frequency calculation unit 232, and has a different configuration of an amount-of-correction determination unit 235 and a correction execution unit 236. It should be noted that the alarm frequency calculation unit 232 and the record-of-work storage unit 133 of the inspection management server apparatus 205 are optional constituent elements and either of these constituent elements may constitute the inspection management server apparatus 205.

Alarm Frequency Calculation Unit 232

The alarm frequency calculation unit 232 counts the number of occurrences of the same alarm about the same machine with reference to records of work stored in the record-of-work storage unit 133.

FIG. 30 is a conceptual diagram showing records of work that are stored in the record-of-work storage unit 133 according to Embodiment 2. Unlike the records of work shown in FIG. 10, the records of work shown in FIG. 30 are records of work performed on the ABS system 1, which is the same machine of the same property B.

For example, according to the records of work shown in FIG. 30, the alarm frequency calculation unit 232 counts the number of occurrences of an alarm A, which is the same alarm about the ABS system 1, which is the same machine.

Amount-of-Correction Determination Unit 235

The amount-of-correction determination unit 235 is a specific example of the first determiner 13 and an example of the first determiner of the present disclosure. The amount-of-correction determination unit 235 determines an amount of correction. In Embodiment 2, the amount-of-correction determination unit 235 determines, from work features extracted by the work feature extraction unit 134, an amount of correction by which the number of occurrences of an alarm is weighted. This example is described with reference to drawings, with the number of occurrences of an alarm being referred to as the number of occurrences of alarm generation.

FIG. 31A is a diagram showing examples of work features that are extracted by the work feature extraction unit 134 according to Embodiment 2. FIG. 31B is a diagram showing an example of an amount-of-correction determination table according to Embodiment 2. FIG. 31C is a diagram showing an example of an amount of correction that is determined by the amount-of-correction determination unit 235 according to Embodiment 2. It should be noted that the examples of work features shown in FIG. 31A are the same as those shown in FIG. 11D as a result of a process performed by the work feature extraction unit 134.

With reference to the amount-of-correction determination table shown in FIG. 31B, the amount-of-correction determination unit 235 determines an amount of correction from the work features shown for example in FIG. 31A so that a great weight is assigned to a serious abnormality and a small weight is assigned to a minor abnormality as shown for example in FIG. 31C. It should be noted that FIG. 31B shows an amount of correction that is uniquely determined according to a combination of work features such as the presence or absence of an alarm, the presence or absence of work such as inspection, and the rate of deterioration of parts.

In FIG. 31B, for example, when the rate of deterioration of parts is low in the absence of an alarm or work such as inspection, there is no need to correct the number of occurrences of alarm generation, so that the amount of correction takes on 1.0. On the other hand, when the rate of deterioration of parts is medium or high in the absence of an alarm but in the presence of work such as inspection, there is need to increase the number of occurrences of alarm generation by weighting the number of occurrences of alarm generation, so that the amount of correction takes on 1.5 or 2.0 according to the rate of deterioration.

Further, in FIG. 31B, for example, when the rate of deterioration of parts is medium in the presence of an alarm and work such as inspection, it can be estimated that there was no failure in any part when the work such as inspection was actually performed, although the alarm was generated. Therefore, when the rate of deterioration of parts is medium in the presence of an alarm and work such as inspection, there is no need to weight the number of occurrences of alarm generation, so that the amount of correction takes on 1.0. When the rate of deterioration of parts is high in the presence of an alarm and work such as inspection, there is need to increase the number of occurrences of alarm generation by weighting the number of occurrences of alarm generation, so that the amount of correction takes on 1.5. On the other hand, when the rate of deterioration of parts is low in the presence of an alarm but in the absence of work such as inspection, it can be estimated that there is no need to consider the number of occurrences of alarm generation with no problems in the parts, so that the amount of correction takes on 0.

Correction Execution Unit 236

The correction execution unit 236 is a specific example of the first determiner 13 and an example of the first determiner of the present disclosure. On the basis of a history of degrees of deterioration of each part of the air-conditioning facilities during past inspections and in consideration of the frequency of occurrence of past abnormalities in each part of the air-conditioning facilities, the correction execution unit 236 corrects and determines a priority of inspection work that is performed on each part of the air-conditioning facility to be inspected. In Embodiment 2, the correction execution unit 236 determines an inspection priority by correcting, with the amount of correction determined by the amount-of-correction determination unit 235, the number of occurrences of alarm generation counted by the alarm frequency calculation unit 232. Note here that the inspection priority is the weighted frequency of occurrences of alarm generation obtained by correcting the number of occurrences of alarm generation with the amount of correction determined by the amount-of-correction determination unit 235, and represents the importance of an inspection. The correction execution unit 236 may also calculate an amount of correction to the same part of the same machine using the amount of correction determined for each record of work by the amount-of-correction determination unit 235. This example is described below with reference to a drawing.

FIG. 32 is a diagram showing an example of an amount of correction determined for each record of work. FIG. 32 shows, as examples, amounts of correction to records of work performed on the same part of the same machine, i.e. the heat exchanger a of the ABS system 1 of the property B shown in FIG. 30.

The average value of such amounts of correction determined for the records of work performed on the same part of the same machine as those shown in FIG. 30 is calculated by the correction execution unit 236, for example, according to Eq. (3) above.

In Embodiment 2, Wk is the amount of correction to the number of occurrences of alarm generation and N is the number of records of work.

It should be noted that the average value of amounts of correction is not limited to being calculated from amounts of correction for each separate one of records of work performed on the same part of the same machine. As in Embodiment 1, amounts of correction pertaining to the same part of the same machine may be calculated using amounts of correction pertaining to a similar machine in a similar environment.

The weighted frequency of occurrences of alarm generation x' obtained by correcting the number of occurrences of alarm generation x is calculated by the correction execution unit 236 according to Eq. (5) below using the average value of the amounts of correction thus calculated. Note here that the weighted frequency of occurrences of alarm generation x' means the importance of an inspection or the like.

$$x' = \overline{w}x \qquad (5)$$

In this way, the correction execution unit 236 determines the weighted frequency of occurrences of alarm generation, which is an inspection priority, by correcting the number of occurrences of alarm generation x.

Configuration of Information Terminal 206

The information terminal 206 differs from the information terminal 106 shown in FIG. 6 in that the former has a different configuration of a work content production unit 238.

Work Content Production Unit 238

The work content production unit 238 is an example of the controller of the present disclosure. The work content production unit 238 causes the display unit 139 to display information indicating a priority of inspection work determined by the inspection management server apparatus 205. It should be noted that when the inspection management server apparatus 205 includes a display, the inspection management server apparatus 205 may include the work content production unit 238.

In Embodiment 2, the work content production unit 238 causes the display unit 139 to display information including the numbers of past occurrences of alarm generation and the weighted frequency of occurrences of alarm generation as acquired by the inspection management server apparatus 205. Moreover, the work content production unit 238 produces and displays suggested work contents or suggested work items that recommend inspecting items that are high in the weighted frequency of occurrences of alarm generation. The work content production unit 238 may notify some or all of the information indicated in the suggested work contents or suggested work items thus produced to an information terminal or the like that is used by a worker who performs maintenance.

Figure 33:
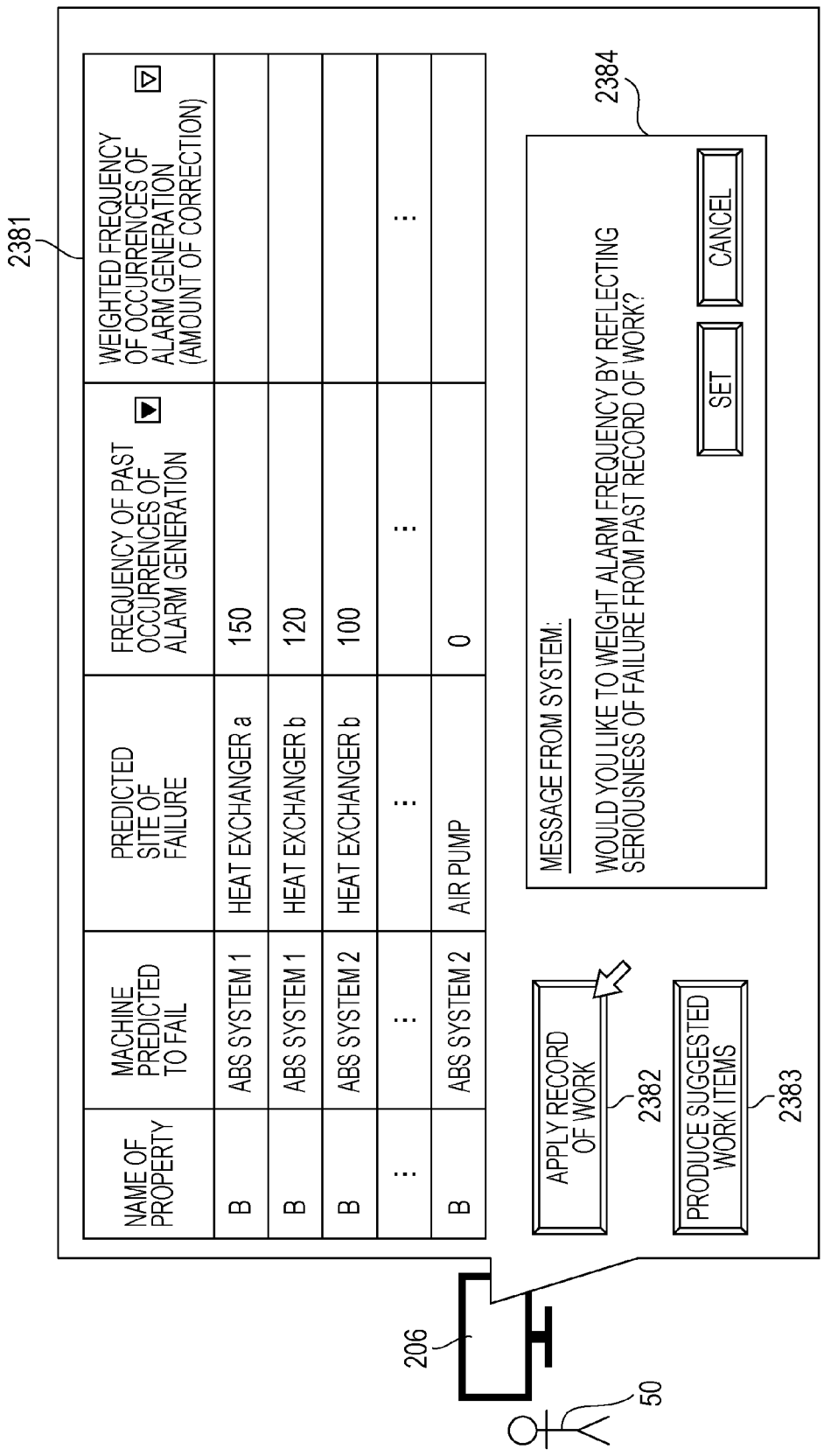
FIG. 33 is a conceptual diagram showing a screen image displaying the numbers of past occurrences of alarm generation about items to be inspected according to Embodiment 2.

FIG. 33 is a conceptual diagram showing a screen image displaying the numbers of past occurrences of alarm generation about items to be inspected according to Embodiment 2. The screen image shown in FIG. 33 shows a table 2381 in which the name of the property, the machine predicted to fail, the predicted site of failure, and the frequency of past occurrences of alarm generation are displayed but the weighted frequency of occurrences of alarm generation is not yet set. Note here that the frequency of past occurrences of alarm generation is the aforementioned number of occurrences of alarm generation. Further, this screen image also shows an icon 2382 that allows application of a record of work to be executed by putting the cursor on and selecting the icon 2382, an icon 2383 that allows suggested work items to be produced by putting the cursor on and selecting the icon 2383, and an area 2384. When the icon 2382 is selected, the weighted frequency of occurrences of alarm generation, which is an inspection priority obtained by correcting the frequency of occurrences of alarm generation, is inputted.

In the example shown in FIG. 33, the icon 2382 is selected by a user 50 of the information terminal 206, and a message for actually configuring the settings for the weighted frequency of occurrences of alarm generation, which is an inspection priority obtained by correcting the frequency of occurrences of alarm generation, is displayed in the area 2384. By selecting the "SET" icon displayed in the area 2384, the user 50 of the information terminal 206 can cause the work content production unit 238 to input the weighted frequency of occurrences of alarm generation to the table 2381.

Figure 34:
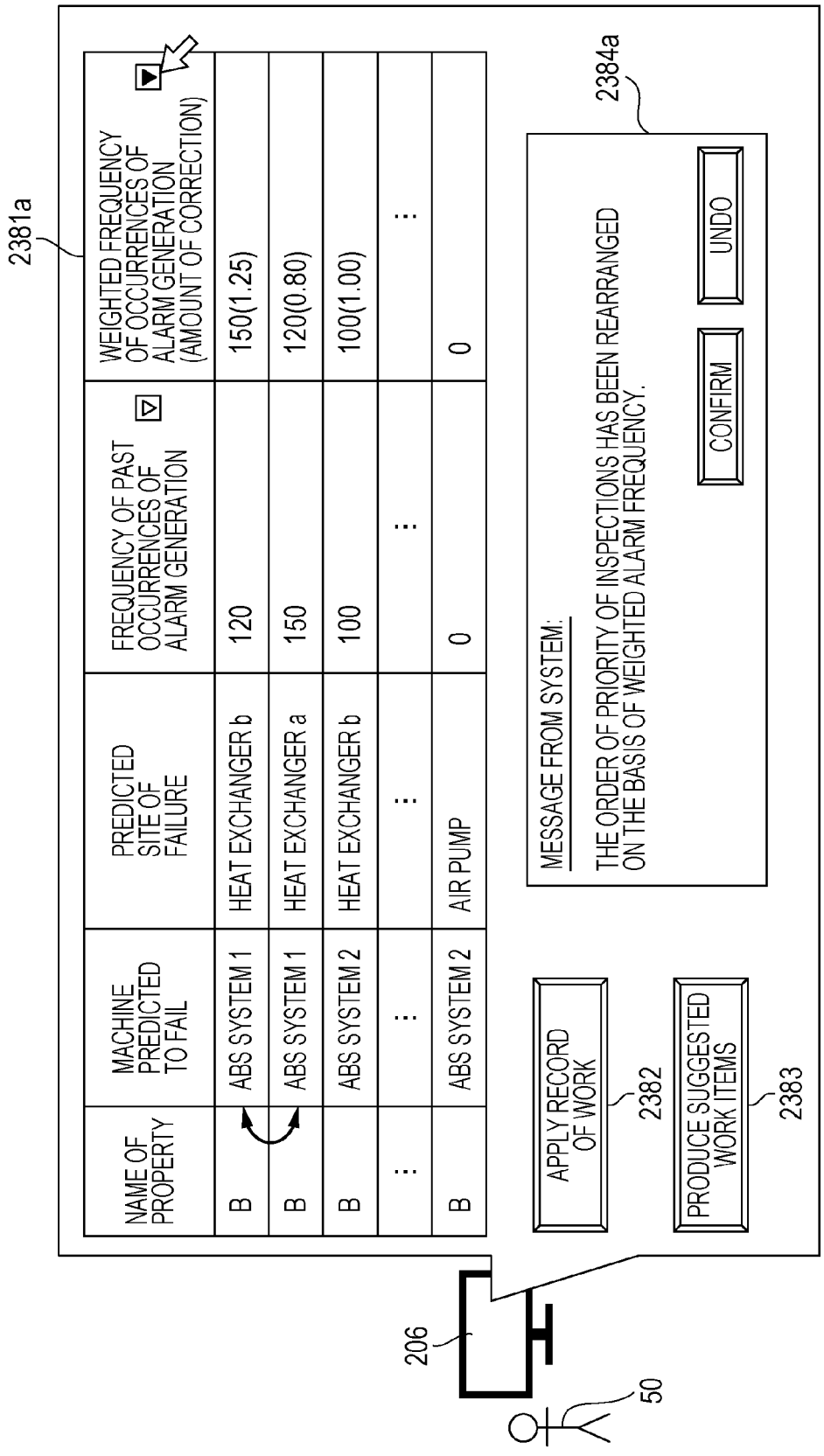
FIG. 34 is a conceptual diagram showing a screen image for changing inspection priorities on the basis of the weighted frequency of occurrences of alarm generation according to Embodiment 2.

FIG. 34 is a conceptual diagram showing a screen image for changing inspection priorities on the basis of the weighted frequency of occurrences of alarm generation according to Embodiment 2. It should be noted that elements that are identical to those of FIG. 33 are given the same reference numerals and are not described in detail here. The screen image shown in FIG. 34 shows a table 2381a obtained by inputting the weighted frequency of occurrences of alarm generation to the table 2381. Further, this screen image also shows an icon for rearranging the weighted frequency of occurrences of alarm generation of the table 2381a. By putting the cursor on and selecting the icon for rearranging the weighted frequency of occurrences of alarm generation of the table 2381a, the user 50 of the information terminal 206 can rearrange the rows of the table 2381a on the basis of the weighted frequency of occurrences of alarm generation.

In the example shown in FIG. 34, the rows of the table 2381a have been rearranged on the basis of the weighted frequency of occurrences of alarm generation by the user 50 of the information terminal 206. Therefore, in the area 2384a, a display is performed which shows that the inspection priorities, i.e. the order of priority of inspections, have been rearranged on the basis of the weighted frequency of occurrences of alarm generation. It should be noted that, as shown in FIG. 34, the table 2381a also shows an icon for rearranging the frequency of past occurrences of alarm generation. That is, as the inspection priorities, i.e. the order of priority of inspections, both the weighted frequency of occurrences of alarm generation and the frequency of past occurrences of alarm generation can be optionally selected.

Figure 35:
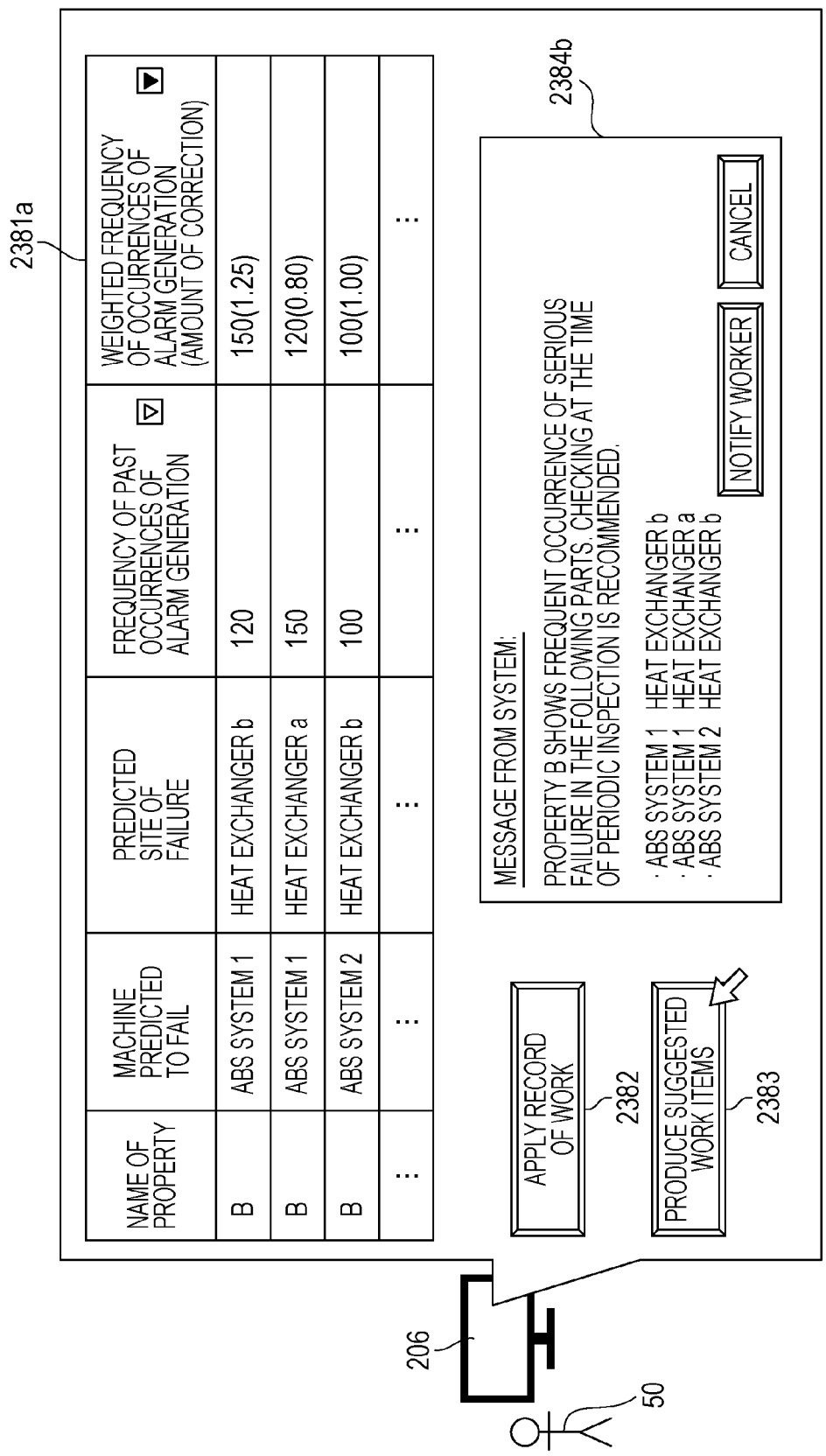
FIG. 35 is a conceptual diagram showing a screen image for producing suggested work items of inspection from the weighted alarm frequency according to Embodiment 2.

FIG. 35 is a conceptual diagram showing a screen image for producing suggested work items of inspection from the weighted alarm frequency according to Embodiment 2. It should be noted that elements that are identical to those of FIG. 34 are given the same reference numerals and are not described in detail here. The screen image shown in FIG. 35 is one obtained by rearranging the rows of the table 2381a on the basis of the weighted alarm frequency. Moreover, the icon 2383 is selected by the user 50 of the information terminal 206, and the work content production unit 238 displays, in an area 2384b, a message, i.e. suggested work items, that recommends inspecting items that are high in the weighted frequency of occurrences of alarm generation. For example, when the icon 2383 is selected, the work content production unit 238 produces and displays, in the area 2384b, a message, or suggested work items, that recommends simultaneously inspecting sites that are items of the same property B which are high in the weighted alarm frequency.

When the user 50 of the information terminal 206 selects the icon "NOTIFY WORKER" shown in the area 2384b, the work content production unit 238 may notify information indicating the set message or suggested work items shown in the area 2384b to an information terminal or the like that is used by a worker who performs maintenance.

In this way, the work content production unit 238 can produce and present suggested work items with reference to the weighted alarm frequency.

Figure 36:
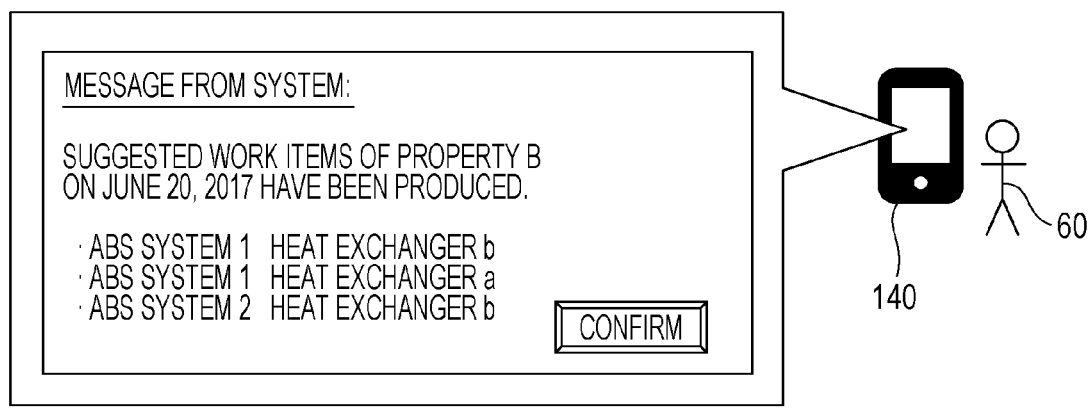
FIG. 36 is a conceptual diagram showing a screen image by which a worker is notified of suggested work items according to Embodiment 2.

FIG. 36 is a conceptual diagram showing a screen image by which a worker is notified of suggested work items according to Embodiment 2. When the icon "NOTIFY WORKER" shown in the area 2383b of FIG. 35 is selected, the work content production unit 238 notifies the information terminal 140 of the worker 60 of the suggested work items of the screen image shown for example in FIG. 36.

It should be noted that the work content production unit 238 is not limited to, as shown in the area 2384b of FIG. 35, producing suggested work items that recommend simultaneously inspecting sites that are items of the same property B which are high in the weighted alarm frequency. This is described below.

Figure 37:
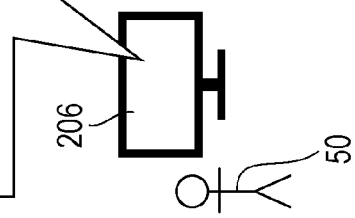
FIG. 37 is a conceptual diagram showing a screen image in which the table shown in FIG. 35 includes information on working hours and working tools.

FIG. 37 is a conceptual diagram showing a screen image in which the table shown in FIG. 35 includes information on working hours and working tools. As shown in a table 2381b of FIG. 37, the estimated working hours and the working tool may be shown in addition to the name of the property, the machine predicted to fail, the predicted site of failure, the frequency of past occurrences of alarm generation, and the weighted frequency of occurrences of alarm generation. Note here that the estimated working hours show an estimated period of time required for work such as inspection on the predicted site of failure. The working tool shows a tool required for work such as inspection on the predicted site of failure.

Figure 38:
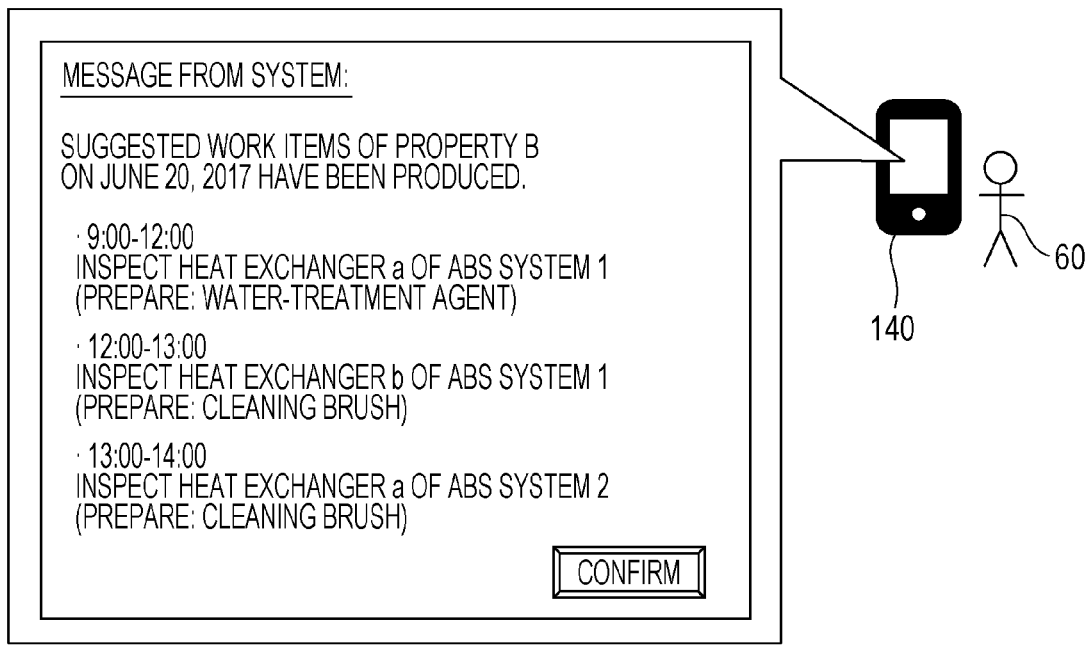
FIG. 38 is a conceptual diagram showing a screen image by which a worker is notified of suggested work items including information on working hours and working tools.

FIG. 38 is a conceptual diagram showing a screen image by which a worker is notified of suggested work items including information on working hours and working tools. The work content production unit 238 may produce such suggested work items as those shown in FIG. 38 on the basis of the table 2381b shown in the screen image shown for example in FIG. 37 and notify the information terminal 140 of the worker 60 of the suggested work items.

Operation of Inspection Management System 102A

The following describes a process that is performed by the inspection management system 102A according to Embodiment 2.

Figure 39:
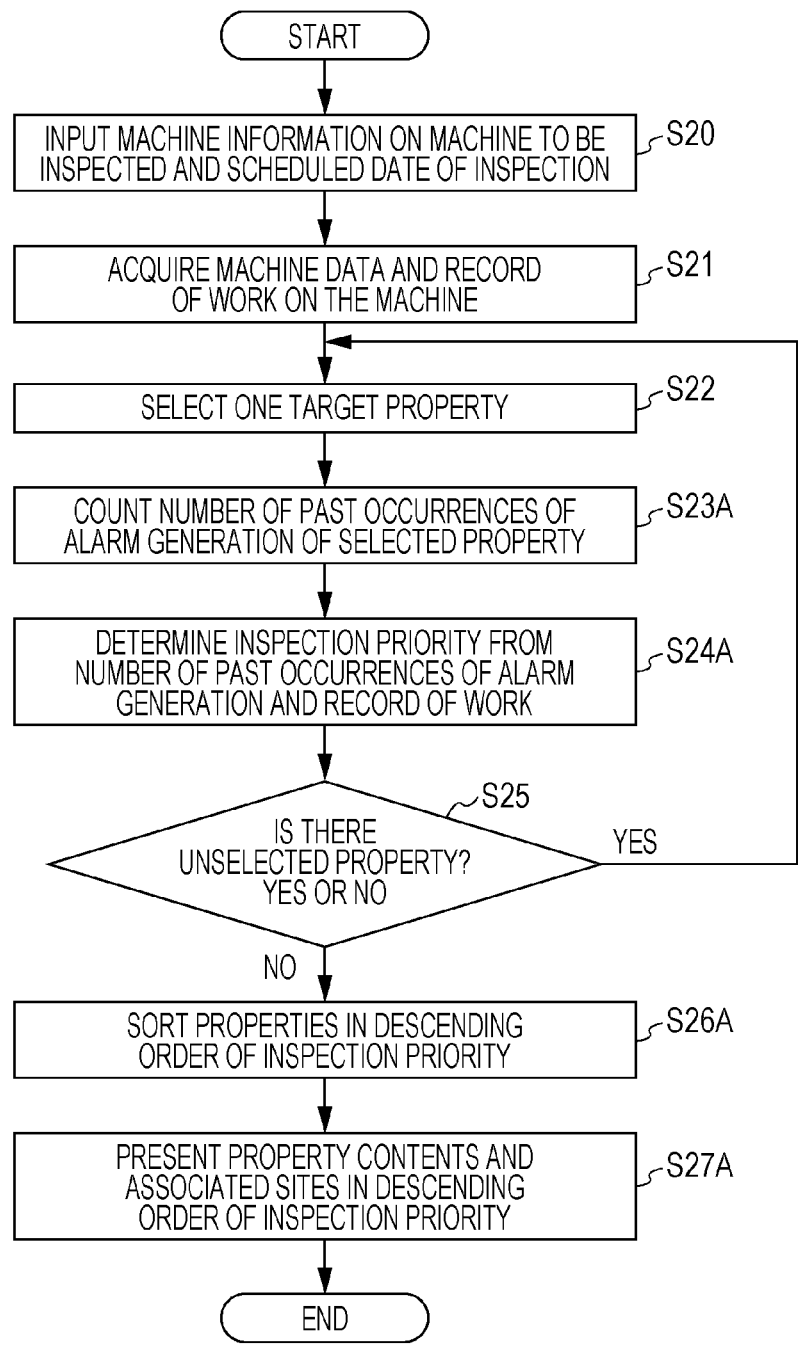
FIG. 39 is a flow chart showing details of a process that is performed by the inspection management system according to Embodiment 2.

FIG. 39 is a flow chart showing details of a process that is performed by the inspection management system 102A according to Embodiment 2. FIG. 39 shows a process that is performed by the inspection management system 102A at the time of a periodic inspection. It should be noted that elements that are identical to those of FIG. 23 are given the same reference numerals and are not described in detail here.

In S22, the inspection management system 102A selects one target property from among the properties in the record of work. Then, the inspection management system 102A counts the number of past alarms from the record of work (S23A) and determines an inspection priority from the number of past alarms and the record of work (S24A). If there is an unselected property, the process is redone from S22, and if there is no unselected property, the process proceeds to S26A.

Next, the inspection management system 102A sorts the properties in descending order of inspection priority (S26A) and causes the display to display the property contents and associated sites of the properties in descending order of inspection priority (S27A).

Figure 40:
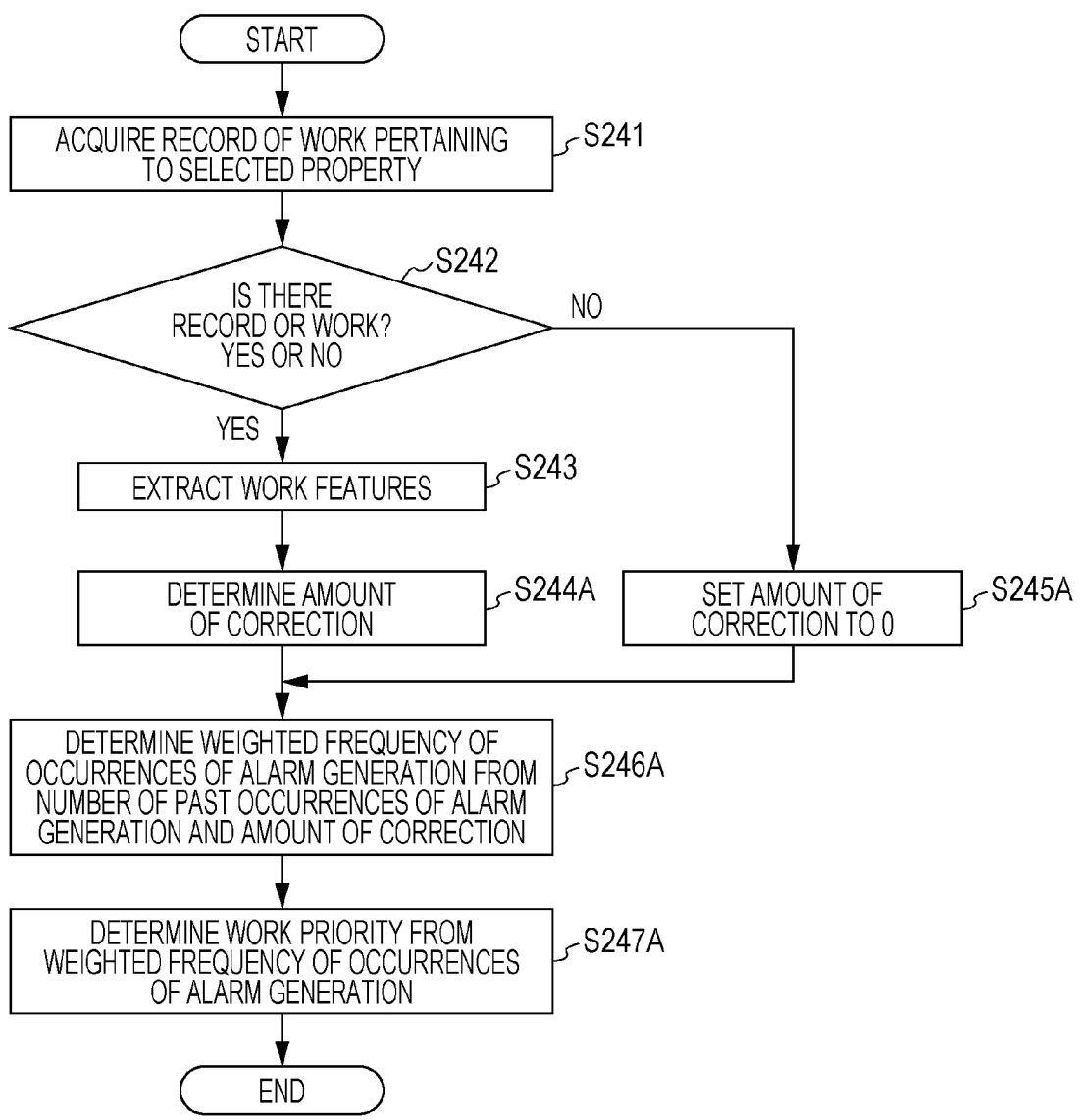
FIG. 40 is a flow chart showing details of the process in S24A shown in FIG. 39.

FIG. 40 is a flow chart showing details of the process in S24A shown in FIG. 39. The process shown in FIG. 40 is performed by the inspection management server apparatus 205 and the information terminal 206 of the inspection management system 102A. It should be noted that elements that are identical to those of FIG. 24 are given the same reference numerals and are not described in detail here.

If, in S243, the work feature extraction unit 134 of the inspection management server apparatus 205 extracts work features, the amount-of-correction determination unit 235 of the inspection management server apparatus 205 determines an amount of correction (S244A). For example, the amount-of-correction determination unit 235 determines an amount of correction by which the number of occurrences of alarm generation is weighted.

Next, the correction execution unit 236 of the inspection management server apparatus 205 determines the weighted frequency of occurrences of alarm generation from the number of past occurrences of alarm generation and the amount of correction (S246A). For example, the correction execution unit 236 determines the weighted frequency of occurrences of alarm generation by correcting, with the amount of correction determined by the amount-of-correction determination unit 235, the number of occurrences of alarm generation counted by the alarm frequency calculation unit 232.

Next, the work content production unit 238 of the information terminal 206 determines an inspection priority from the recommended date of inspection determined in S246A (S247A). For example, the work content production unit 238 determines a work priority from the weighted frequency of occurrences of alarm generation notified from the inspection management server apparatus 205 and produces suggested work contents indicating the work priority thus determined. Note here that the work priority means an order of priority in which work is performed and refers to a descending order of items in the weighted frequency of occurrences of alarm generation.

It should be noted that if, in S242, there is no record of work that can be acquired ("NO" in S242), the amount-of-correction determination unit 235 of the inspection management server apparatus 205 determines to set the amount of correction to "0" (S245A). The subsequent processes, which have been described above, are not described here.

It should be noted that the processes shown in FIGS. 39 and 40 are performed at appropriate timings. That is, these processes do not need to be successively performed.

Effects and the Like of Inspection Management System 102A

Such a configuration and operation of the inspection management system 102A correct the number of past occurrences of alarm generation on the basis of the features of work contents included in a record of work. This makes it possible to obtain the weighted frequency of occurrences of alarm generation, to which a great weight has been assigned by a serious failure, thus making it possible to accurately determine an order of priority of sites on which inspections or the like are to be performed. This in turn makes it possible to achieve a shortening of working hours of inspection or the like that the worker 60 perform on a machine 101 such as an air-conditioning facility or a refrigeration facility and a reduction in the number of visits for work such as inspection of the machine 101. This makes it possible to further improve the efficiency of inspection management of air-conditioning facilities.

Furthermore, such a configuration and operation of the inspection management system 102 makes it possible to determine the weighted frequency of occurrences of alarm generation obtained by correcting the number of past occurrences of alarm generation, thus allowing a failure diagnosis not based on experience of the worker 60 and making it possible to conduct efficient maintenance operations of work such as inspection.

It should be noted, in the embodiments and the like described above, each of the constituent elements may be configured by dedicated hardware or may be realized by executing a software program suited to that constituent element. Each of the constituent elements may be may be realized by a program executer such as a CPU or a processor reading out and executing a software program stored in a storage medium such as a hard disk or a semiconductor memory.

Further, in the embodiments and the like described above, each of the constituent elements may be a circuit. Constituent elements may constitute a single circuit as a whole or may constitute each separate circuit. Further, the circuits may each be a general-purpose circuit or a dedicated circuit.

Further, in the embodiments and the like described above, an appropriate combination of input screens, output screens, and the like may be displayed on a display. The inspection management system and the inspection management method of the present disclosure, for example, can be applied to refrigeration facilities such as showcases or refrigerators.

In the foregoing, an inspection management system and an inspection management method according to one or more aspects have been described with reference to the embodiments and the like. However, the present disclosure is not limited to these embodiments. Embodiments formed by applying, to the present embodiment, various modifications of which persons skilled in the art conceive and embodiments formed by combining constituent elements of different embodiments may be encompassed in the scope of one or more aspects, provided such embodiments do not depart from the scope of the present disclosure.

For example, Embodiments 1 and 2 may be combined to determine, from recommended dates of inspection or the weighted frequency of occurrences of alarm generation, an order of priority of properties or sites on which inspections or the like are to be performed.

Further, in an inspection management system according to one or more aspects, a time schedule of work according to which inspections or the like are performed may be suggested by inputting the priorities of properties or the number of workers.

Furthermore, for example, in the embodiments and the like described above, a process that is executed by a particular constituent element may be executed by another constituent element in place of the particular constituent element. Further, the order of processes may be changed, and the processes may be concurrently executed.

The present disclosure is applicable to an inspection management system and an inspection management method. For example, the present disclosure is applicable to a system or the like that manages machines such as air-conditioning facilities and/or refrigeration facilities.

What is claimed is:

1. A system comprising:
    a memory that stores a degree of deterioration determined from information about the unavailability of a function of air-conditioning and/or refrigeration facilities or the lack of a predetermined performance of the air-conditioning or refrigeration facilities thereof;
    a processor that determines predicted dates of the unavailability of a function of air-conditioning and/or refrigeration facilities or the lack of a predetermined performance of the air-conditioning or refrigeration facilities for each part of each of the air-conditioning facilities and/or the refrigeration facilities; and
    a display that displays first and second screens,
    the first screen displaying
        dates of predicted future failure for each part of each of the air-conditioning facilities and/or the refrigeration facilities determined the by processor,
        blank fields labeled as displaying the determined predicted dates of the unavailability of a function of air-conditioning and/or refrigeration facilities or the lack of a predetermined performance of the air-conditioning or refrigeration facilities for each part of each of the air-conditioning facilities and/or the refrigeration facilities, but which are blank, and
        a selectable icon, which when selected, causes the display to display a second screen in which the blank fields have been replaced by the determined predicted dates of the unavailability of a function of air-conditioning and/or refrigeration facilities or the lack of a predetermined performance of the air-conditioning or refrigeration facilities for each part of each of the air-conditioning facilities and/or the refrigeration facilities, and
    the second screen, displayed in response to selecting the selectable icon in the first screen, displaying
        the dates of predicted future failure for each part of each of the air-conditioning facilities and/or the refrigeration facilities,
        a field filled with the determined predicted dates of the unavailability of a function of air-conditioning and/or refrigeration facilities or the lack of a predetermined performance of the air-conditioning or refrigeration facilities for each part of each of the air-conditioning facilities and/or the refrigeration facilities,
        a rearranging selectable icon, which when selected rearranges at least two of the dates listed in the field, changing the listed order of priority of determined predicted dates of the unavailability of a function of air-conditioning and/or refrigeration facilities or the lack of a predetermined performance of the air-conditioning or refrigeration facilities,
        a first selectable icon, which when selected, sets the dates listed in the field, and
        a second selectable icon, which when selected, confirms the rearranged listed order of priority of determined predicted dates of the unavailability of a function of air-conditioning and/or refrigeration facilities or the lack of a predetermined performance of the air-conditioning or refrigeration facilities changed by selection of the rearranging selectable icon,
        the dates listed in the field being determined by the processor on the basis of a history of degrees of deterioration of each part of the air-conditioning facilities and/or the refrigeration facilities; and
    a controller that causes the display to display the first and second screens.

2. The system according to claim 1, further comprising:
    an acquirer that acquires information pertaining to the degree of deterioration from a record of work performed on each part of each of the air-conditioning facilities and/or the refrigeration facilities; and
    wherein the processor determines the history of degrees of deterioration of each part of the air-conditioning facilities and/or the refrigeration facilities during the past inspections from the information pertaining to the degree of deterioration as acquired by the acquirer,
    wherein the record of work includes the manual-inspection information of the part,
        the acquirer acquires the information pertaining to the degree of deterioration from the manual-inspection information, and
        the memory stores the history of degrees of deterioration of each part of the air-conditioning facilities and/or the refrigeration facilities during the past inspections as determined by the processor.

3. The system according to claim 1, wherein, in consideration of the frequency of occurrence of past abnormalities in each part of the air-conditioning facilities and/or the refrigeration facilities, the processor determines either the predicted dates of the unavailability of a function of air-conditioning and/or refrigeration facilities or the lack of a predetermined performance of the air-conditioning or refrigeration facilities, or the priority among the predicted dates of the unavailability of a function of air-conditioning and/or refrigeration facilities or the lack of a predetermined performance of the air-conditioning or refrigeration facilities.

4. A method comprising:
(a) storing in a memory a degree of deterioration determined from information about the unavailability of a function of air-conditioning and/or refrigeration facilities or the lack of a predetermined performance of the air-conditioning or refrigeration facilities thereof;
(b) determining with a processor predicted dates of the unavailability of a function of air-conditioning and/or refrigeration facilities or the lack of a predetermined performance of the air-conditioning or refrigeration facilities;
(c) displaying a first screen of a display displaying
dates of predicted future failure for each part of each of the air-conditioning facilities and/or the refrigeration facilities,
blank fields labeled as displaying the determined predicted dates of the unavailability of a function of air-conditioning and/or refrigeration facilities or the lack of a predetermined performance of the air-conditioning or refrigeration facilities for each part of each of the air-conditioning facilities and/or the refrigeration facilities, but which are blank, and
a selectable icon, which when selected, causes the display to display a second screen in which the blank fields have been replaced by the determined predicted dates of the unavailability of a function of air-conditioning and/or refrigeration facilities or the lack of a predetermined performance of the air-conditioning or refrigeration facilities for each part of each of the air-conditioning facilities and/or the refrigeration facilities; and
(d) displaying a second screen of the display in response to selecting the selectable icon in the first screen, the second screen displaying
the dates of predicted future failure for each part of each of the air-conditioning facilities and/or the refrigeration facilities,
a field filled with the determined predicted dates of the unavailability of a function of air-conditioning and/or refrigeration facilities or the lack of a predetermined performance of the air-conditioning or refrigeration facilities for each part of each of the air-conditioning facilities and/or the refrigeration facilities,
a rearranging selectable icon, which when selected rearranges at least two of the dates listed in the field, changing the listed order of priority of determined predicted dates of the unavailability of a function of air-conditioning and/or refrigeration facilities or the lack of a predetermined performance of the air-conditioning or refrigeration facilities,
a first selectable icon, which when selected, sets the dates listed in the field, and
a second selectable icon, which when selected, confirms the rearranged listed order of priority of determined predicted dates of the unavailability of a function of air-conditioning and/or refrigeration facilities or the lack of a predetermined performance of the air-conditioning or refrigeration facilities changed by selection of the rearranging selectable icon,
the dates listed in the field being determined by the processor on the basis of a history of degrees of deterioration of each part of the air-conditioning facilities and/or the refrigeration facilities.

* * * * *